United States Patent [19]
Katsura et al.

[11] Patent Number: 5,721,995
[45] Date of Patent: Feb. 24, 1998

[54] LENS-FITTED PHOTOGRAPHIC FILM UNIT HAVING SHUTTER WITH CONNECTION LEVER AND CRANK LEVER

[75] Inventors: Hirofumi Katsura; Fuminori Kawamura, both of Kanagawa; Hideo Sasajima, Ibaragi; Yukihiko Yamaguchi, Kanagawa, all of Japan

[73] Assignees: Fuji Photo Film Co., Ltd., Kanagawa; Fuji Photo Optical Co., Ltd., Saitama, both of Japan

[21] Appl. No.: 560,401

[22] Filed: Nov. 17, 1995

Related U.S. Application Data

[63] Continuation-in-part of Ser. No. 385,136, Feb. 7, 1995, abandoned.

[30] Foreign Application Priority Data

| Feb. 10, 1994 | [JP] | Japan | 6-16567 |
| Apr. 14, 1994 | [JP] | Japan | 6-75884 |
| Apr. 15, 1994 | [JP] | Japan | 6-77583 |

[51] Int. Cl.$^6$ ............... G03B 15/00; G03B 9/10; G03B 9/20
[52] U.S. Cl. ............... 396/351; 396/6; 396/493; 396/500; 396/501
[58] Field of Search ............... 396/6, 296, 351, 396/373, 493, 497, 500, 501, 505

[56] References Cited

U.S. PATENT DOCUMENTS

| 4,283,129 | 8/1981 | Bennick, Jr. | 396/351 X |
| 5,084,719 | 1/1992 | Hara et al. | 396/6 |
| 5,225,864 | 7/1993 | Hargrave | 396/296 |
| 5,381,200 | 1/1995 | Takagai | 396/493 |

FOREIGN PATENT DOCUMENTS 4-130931  12/1992  Japan.

*Primary Examiner*—Howard B. Blankenship
*Attorney, Agent, or Firm*—Young & Thompson

[57] ABSTRACT

In a lens-fitted photographic film unit, a connection lever makes one reciprocating movement when struck by a shutter actuating lever. The reciprocating movement of the connection lever is transmitted to a crank lever to a pair of shutter blades to cause the shutter blades to open and then close a shutter aperture. The connection lever is coupled to the crank lever through a connection pin and a cam slot. The cam slot has an actuating portion and a keeping portion. While the connection pin moves along the actuating portion, the movement of the connection lever is transmitted to the shutter blades through the crank lever to open and close the shutter aperture. While the connection pin moves along the keeping portion, the movement of the connection lever is not transmitted to the shutter blades so that the shutter blades are kept in the opened position.

19 Claims, 33 Drawing Sheets

LENS-FITTED PHOTOGRAPHIC FILM UNIT HAVING SHUTTER WITH CONNECTION LEVER AND CRANK LEVER

This application is a Continuation-In-Part of U.S. patent application Ser. No. 08/385,136, filed Feb. 7, 1995, now abandoned.

BACKGROUND OF THE INVENTION

1. Field of the Invention

The present invention relates to a lens-fitted photographic film unit, and more particularly to a telephoto-type lens-fitted photographic film unit having a Z-shaped and elongated optical path of exposure light and a lens aperture changing mechanism therein.

2. Related Art

Various types of lens-fitted photographic film units, hereinafter referred to as film units, have been widely known, each of which is pre-loaded with an ISO-135 type photographic film cassette and has a simple picture-taking mechanism so that anyone can enjoy photography at ease.

The film unit has a unit body which is constituted of a main body section including a film roll chamber and a cassette chamber, and front and rear covers attached to the front and rear of the main body section. The picture-taking mechanism, including a shutter mechanism, a film advancing mechanism and so forth, is incorporated into the main body section. Unexposed photographic film, which is withdrawn from the film cassette and is wound into a roll, is loaded in the film roll chamber, whereas the empty cassette shell is held in the cassette chamber.

When a shutter button is depressed, the shutter mechanism is actuated such that a shutter actuating lever swings from a cocked position to a released position under a force of a spring, to strike a claw formed integrally with a single shutter blade. Then, the shutter blade swings at a constant speed against a force of a spring to open a stop aperture. The shutter blade returns to the initial position under the force of the spring to close the stop aperture.

After an exposure is accomplished in this way, a film advancing wheel is rotated to wind the exposed portion of the photographic film back into the cassette shell, while cocking the shutter actuating lever. When all available frames have been exposed, the film unit is forwarded to a photo-lab without removing the photographic film cassette. In the photo-lab, the exposed photographic film is removed from the unit body and is processed for printing in a conventional manner. Resulting photo-prints and the developed photographic film are returned to the user.

U.S. Pat. No. 5,084,719 (corresponding to JPU 2-104340) discloses a telephoto-type film unit whose taking lens has a focal length of about 70 to 80 mm and an f-number of f/12 to 14. A pair of mirrors are arranged to define a Z-shaped light path inside the unit body so that the light path may be long enough for telephotography without the need for increasing the thickness of the unit body. Also, a film unit having a lens aperture changing mechanism is disclosed in JPU 4-130931, wherein an ND filter is mounted movable into and out of the viewfinder so that either of two differently sized lens apertures is placed behind the taking lens in cooperation with the relocation of the ND filter, in order to change over the exposure amount.

Recently, demand for a film unit or a compact camera having a larger telephoto ratio is increasingly becoming popular, because the spectators wish to take pictures containing larger human subjects in sporting events or the like. For this reason, it is desirable to provide a taking lens having a focal length of about 100 mm or more. It is possible to mount such a long focus lens in the conventional telephoto-type film unit having a Z-shaped light path, simply by disposing the lens forwardly of the front wall of the unit body without the need for increasing the thickness. However, since the shutter blade of the above-described conventional shutter mechanism is moved directly behind the taking lens, it would be necessary to dispose also the shutter actuating lever near the taking lens. Therefore, a certain part of the front cover must protrude forward around the taking lens.

On the other hand, because flash-light is ineffective for a distant subject, the telephoto-type film unit has not been provided with a flash unit. Since sporting events are often played at night under brightly flood-lit conditions, it is necessary for taking properly exposed pictures to adjust the exposure. As the above-mentioned known lens aperture changing mechanism has the lens apertures formed through a swinging member into which also the ND filter is incorporated, a large space for the movement of the swinging member must be provided directly behind the taking lens. Therefore, if the known lens aperture changing mechanism is to be mounted in the telephoto-type film unit, the thickness of the unit body must be further increased around the taking lens. Moreover, a lens aperture changing knob is formed integrally with the swinging member in the known lens aperture changing mechanism, such that the lens aperture changing knob needs to be moved a large amount for switching. This is not desired.

When the taking lens has a longer focal length, e.g., 100 mm or more, the f-number will be larger compared with the taking lens having a focal length of 70 to 80 mm, if the effective lens aperture size is unchanged. Therefore, in order to obtain a sufficient exposure amount for a low brightness subject, it is necessary to provide a larger lens aperture than that used in the known telephoto-type film unit as a larger one of the two different lens apertures. However, in the above-described shutter mechanism, probability of unevenness of exposure would increase with the increase of the lens aperture size, because of the constant speed movement of the shutter blade. It might be possible to increase the speed of the shutter blade by increasing the force of the spring, but it will also shorten the exposure time so much that optimum exposures cannot be obtained for night games.

The pair of mirrors for defining the Z-shaped light path of the conventional telephoto-type film unit has problems in that the mirrors may reflect extraneous light to cause flare and ghost images.

OBJECT OF THE INVENTION

In view of the foregoing, a primary object of the invention is to provide a telephoto-type film unit having a large focal length which can photograph low brightness as well as high brightness subjects at an appropriate exposure value while preventing unevenness of exposure and minimizing the increase of the thickness of the film unit.

Another object of the invention is to provide a telephoto-type film unit having a lens aperture changing mechanism which can be easily, quickly and reliably operated, without the need for increasing the thickness of the film unit.

The present invention is also directed to prevent flare and ghost images caused by internal reflection on the mirrors in the telephoto-type film unit.

SUMMARY OF THE INVENTION

To achieve the above and other objects in a lens-fitted photographic film unit having an exposure mechanism wherein a shutter actuating member is moved from a released position to a cocked position upon one frame advance of the photographic film, and is moved back to the released position under a biasing force upon a shutter release operation, and a shutter blade member is biased toward a closed position for closing an aperture disposed on an optical axis of the taking lens and makes one reciprocating movement between the closed position and an open position for opening the aperture while the shutter actuating member returns to the released position; the returning movement of the shutter actuating member is transmitted to the shutter blade member through a connection lever and a crank lever.

The connection lever is caused by the shutter actuating member to swing from an initial position to a turning position against a biasing force and swing back to the initial position under the biasing force while the shutter actuating member returns to the released position; and the crank lever has an axial portion extending parallel to the optical axis and first and second radial arms on opposite ends of the axial portion, wherein the connection lever is coupled to the first arm of the crank lever, whereas the shutter blade member is coupled to the second arm so as to permit the shutter blade member to swing in a different plane from the connection lever in a direction of the optical axis.

To obtain a sufficient exposure time while preventing unevenness of exposure, a cam portion including an actuating portion and a keeping portion is formed in the crank lever. The actuating portion transmits rotational movement of the connection lever to the shutter blade member while the connection lever moves between the initial position and a first position which is located before the turning position and corresponds to the open position of the shutter blade member. The keeping portion is made so as not to transmit rotational movement of the connection lever while the connection lever moves between the first position and the turning position so as to keep the shutter blade member in the open position for a predetermined time.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
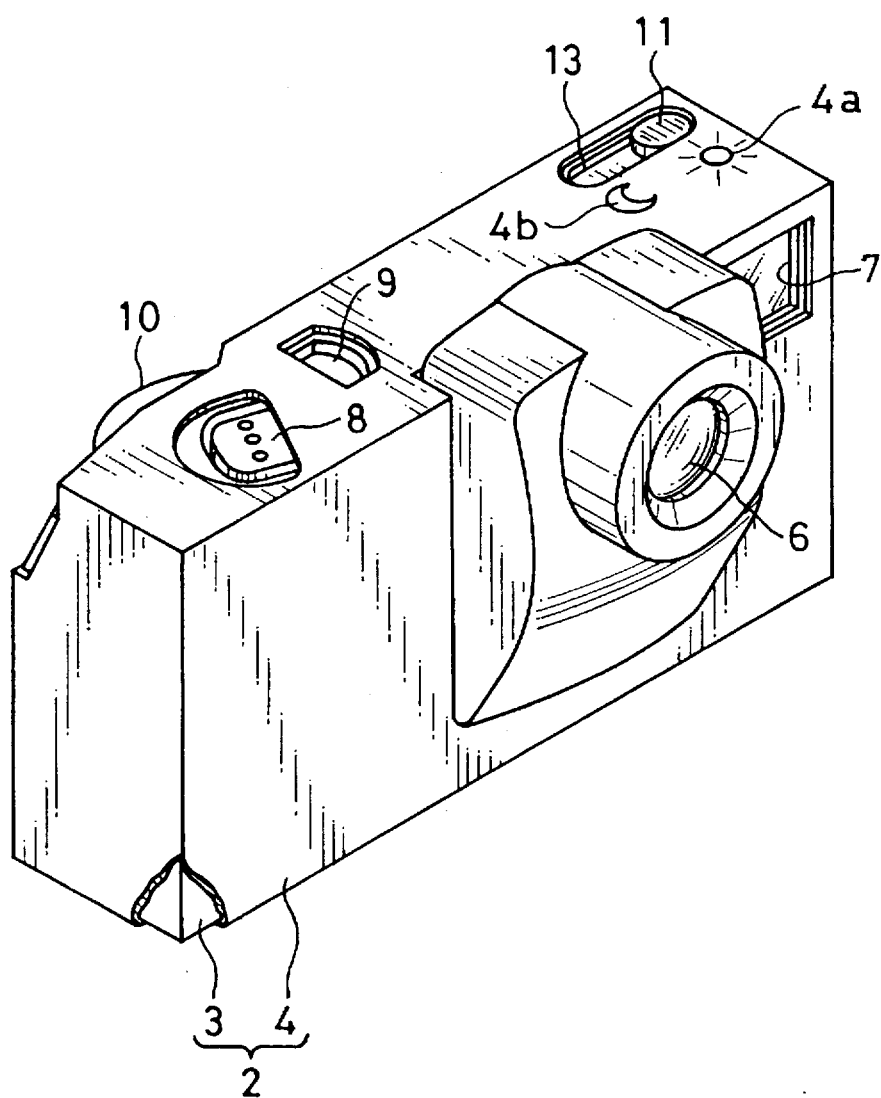
FIG. 1 is a perspective view of a telephoto-type film unit with a daylight/night photography mode switching mechanism according to a preferred embodiment of the invention.

Referring to FIG. 1, a film unit 2 is constituted of a unit body 3 and an outer casing 4 for encasing the unit body 3. The outer casing 4 has ornamentation and information printed thereon. The unit body 3 is provided with a taking lens 6, a viewfinder 7, a shutter release button 8, an available frame number display window 9, a film advancing wheel 10 and a mode switching knob 11, which are exposed to the outside through openings of the outer casing 4. The taking lens 6 is disposed in an upper front portion of the unit body 3, and protrudes forward from the other portion of the film unit 2. The taking lens 6 is a telephotographic lens having a focal length of about 100 mm or more. The viewfinder 7 is a Galilean viewfinder, and a neutral density (ND) filter or a color filter may be removably inserted between the viewfinder optical system, as will be described below.

The mode switching knob 11 is operated to select either daylight photography mode or night photography mode. The daylight photography mode is selected when the knob 11 is moved in one end of a slot 13 which is indicated by a symbol 4a of the sun as shown in FIG. 1. When the knob 11 is slid to the other end of the slot 13 which is indicated by a symbol 4b of the moon, the night photography mode is selected. These symbols 4a and 4b are printed on the outer casing 4. In the daylight photography mode, the filter is inserted in the viewfinder 7, and a small lens aperture is placed in an optical path 35 of the taking lens 6. In the night photography mode, the filter is retracted from the viewfinder 7, and a large lens aperture is placed in the optical axis, as will be described below.

Figure 2:
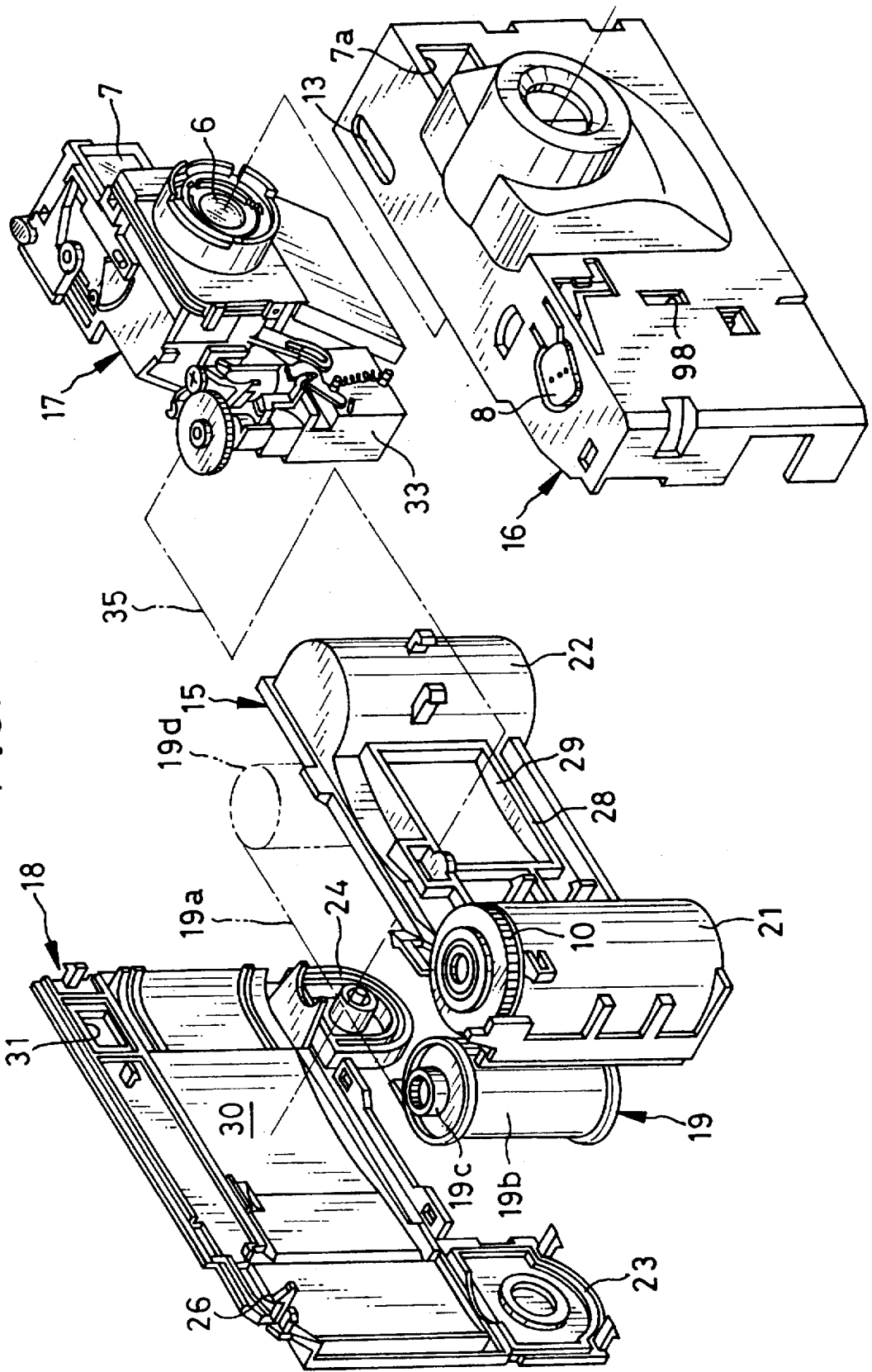
FIG. 2 is an exploded perspective view of the film unit shown in FIG. 1.

As shown in FIG. 2, the unit body 3 is constituted of a main body 15, a front cover 16, a mechanism unit 17 and a rear cover 18. The main body 15 holds a photographic film cassette 19 of ISO 135 type (ISO: 1007–1979) containing high speed photographic film 19a of, for example, ISO 800.

The mechanism unit 17 is removably attached to the front of the main body 15. As will be described in detail below, a photography mode switching mechanism is also incorporated into the mechanism unit 17 in addition to exposure mechanisms including the taking lens 6, a frame counter mechanism, and a one-frame film advancing mechanism including the film advancing wheel 10. The rear cover 18 is removably attached to the rear of the main body 15 to cover the photographic film 19a light-tightly. The front cover 16 is removably attached to the front of the main body 15 to cover the mechanism unit 17.

The main body 15 has a film take-up chamber or cassette chamber 21 for holding a cassette shell 19b of the film cassette 19 and a film supply chamber or film roll chamber 22 for holding the photographic film 19a in rolled condition which is pulled out from the cassette shell 19b and coiled in a roll 19d. Because the film advancing wheel 10 is engaged with a spool 19c of the cassette shell 19b and the photographic film 19a is secured at one end to the spool 19c, the film 19a may be wound back into the cassette shell 19b one frame at a time by rotating the film advancing wheel 10 after each exposure.

The cassette chamber 21 and the film roll chamber 22 have open bottoms, which are closed by bottom lids 23 and 24 formed integrally with the rear cover 18. The bottom lid 24 is used for inserting a tool when winding the photographic film 19a into the roll 19d. The bottom lid 23 is used for removing the cassette shell 19b after the exposed photographic film 19a is completely wound back into the shell 19b. An opening 26 of the rear cover 18 is provided for exposing the film advancing wheel 10 to the outside. Between the cassette chamber 21 and the film roll chamber 22, an exposure frame 28 is disposed to bound a rectangular exposure aperture 29 of 24 mm×36 mm. A finder ocular window 31 is formed through the rear cover 18 in opposition to a finder objective window 7a formed through the front cover 16. A concave film supporting surface 30 is also formed in the rear cover 18 in opposition to the exposure aperture 29. The slot 13 and the shutter button 8 are integrally formed with the front cover 16.

Figure 3:
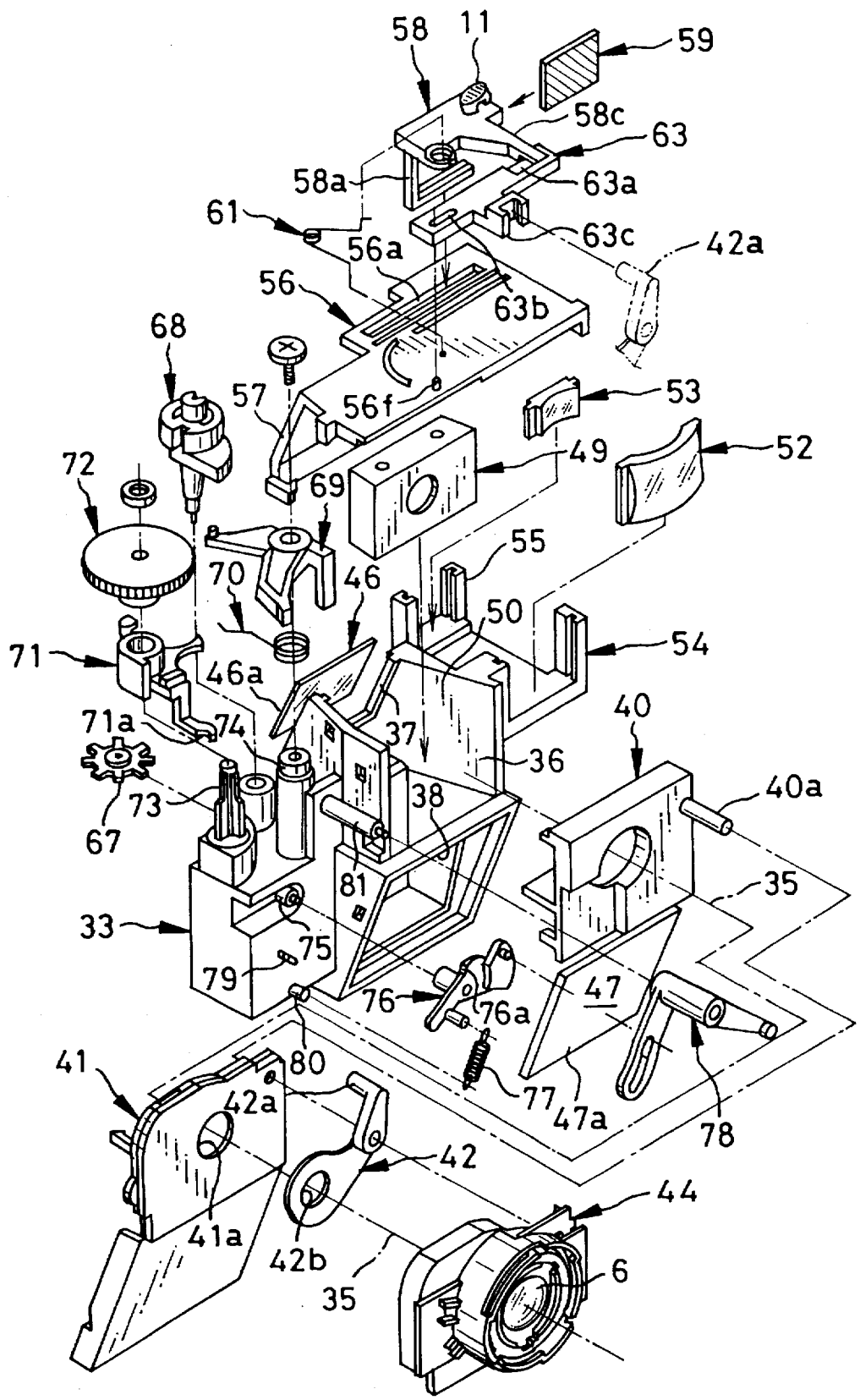
FIG. 3 is an exploded perspective view of a mechanism unit mounted in the film unit shown in FIG. 1.
Figure 4:
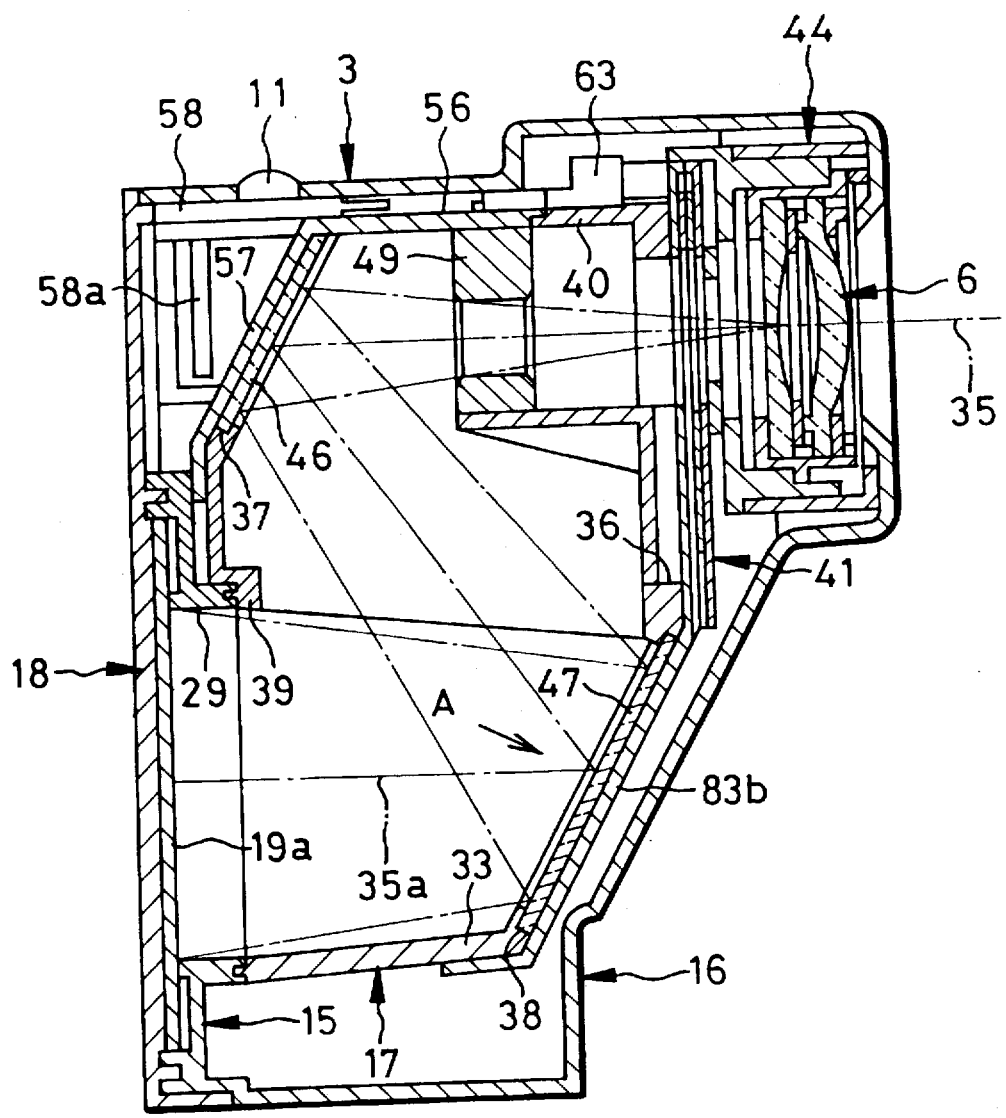
FIG. 4 is a vertical section of the film unit shown in FIG. 1, taken along the optical axis of the taking lens.

As shown in FIGS. 3 and 4, an exposure chamber 33 is integrally formed with a base body for mounting the above-mentioned mechanisms of the mechanism unit 17 thereon. The exposure chamber 33 has an upper front window 36, a rear oblique window 37 formed behind the front window 36 oblique to the optical axis 35 of the taking lens 6, a front oblique window 38 formed below the upper front window parallel to the rear oblique window 37, and a rear window 39. A cover plate 40, a shutter unit 41, a lens aperture changing lever 42 and a taking lens unit 44 are mounted to the upper front window 36 in this order from inside.

An intensified reflection mirror 46 is attached to the rear oblique window 37, whereas an intensified reflection mirror 47 is attached to the front oblique window 38. The taking lens 6 is disposed in the same height as the viewfinder objective window 7. The optical axis 35 of the taking lens 6 is refracted by the mirrors 46 and 47 into a Z-shape, to reach the photographic film 19a disposed behind the exposure opening 39. Since the light flux spreads after passing through the taking lens 6, the size of the lower mirror 47 is greater than that of the upper mirror 46. Because the mirrors 46 and 47 are mounted in parallel to each other, the optical axis 35a of the incident light on the photographic film 19a is also parallel to the optical axis 35 of the taking lens 6.

The intensified reflection mirrors 46 and 47 have an intensified reflection surface each, which is constructed by an aluminum layer, a cerium oxide layer and a titanium oxide layer laminated on one surface of a glass base plate, and has a reflection ratio of 85% or more for light of 700 nm. A light-shielding barrel 49 is mounted between the upper front window 36 and the upper mirror 46, to cut stray or extraneous light traveling outside the effective angle of view. The exposure chamber 33 has an open top 50 between the upper front window and the rear oblique window 37.

Figure 5:
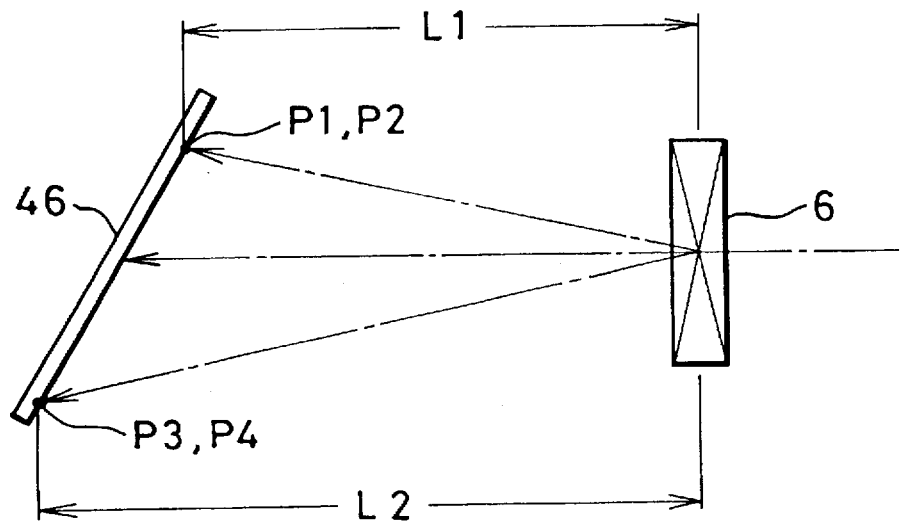
FIG. 5 is an explanatory view illustrating the optical path from the taking lens to an upper mirror, viewed from one side.
Figure 6:
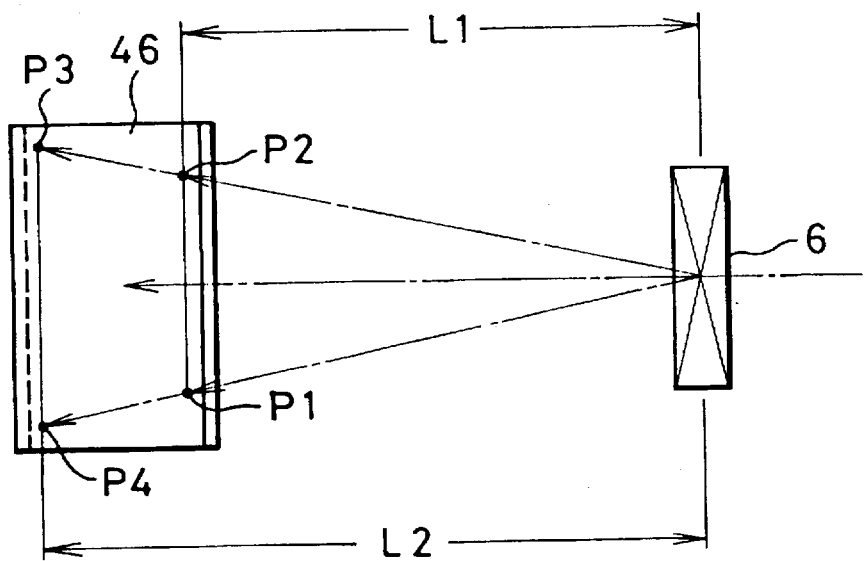
FIG. 6 is an explanatory view illustrating the optical path from the taking lens to the upper mirror, viewed from the bottom.

Since the mirrors 46 and 47 are inclined to the optical axis 35, light beams entering through the taking lens 6 travel different distances to reach the upper mirror 46. As shown in FIGS. 5 and 6, in the light path from the taking lens 6 to the upper mirror 46, the upper- and outermost light beams fall at points P1 and P2 on the upper mirror 46, whereas the lower- and outermost light beams fall at points P3 and P4 on the upper mirror 46. The distance L1 from the taking lens 6 to the points P1 and P2 is smaller than the distance L2 from the taking lens 6 to the points P3 and P4. As a result, the width P1 to P2 of the uppermost portion of the light falling on the mirror is less than the width P3 to P4 of the lowermost portion thereof.

Consequently, the light entering through the taking lens 6 is projected on the upper mirror 46 in form of a trapezoid connecting the four points P1 to P4, and the trapezoid image is reflected therefrom toward the lower mirror 47. Since the mirrors 46 and 47 are conventionally rectangular, extraneous light may cause internal reflection on redundant portions of the lower mirror 47 that are unnecessary for reflecting the trapezoid image. The internal reflection will cause flare or ghost images.

Figure 7:
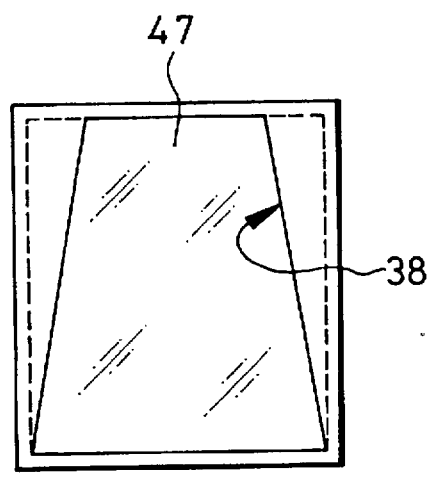
FIG. 7 is an explanatory view of a lower mirror held in a lower oblique window of the mechanism unit, viewed in a direction indicated by an arrow A in FIG. 4.

According to a preferred embodiment shown in FIG. 7, the front oblique window 38 is formed as a trapezoid corresponding to the trapezoid image on the lower mirror 47. Thereby, internal reflection on the redundant portions of the lower mirror 47 is prevented.

Figure 8:
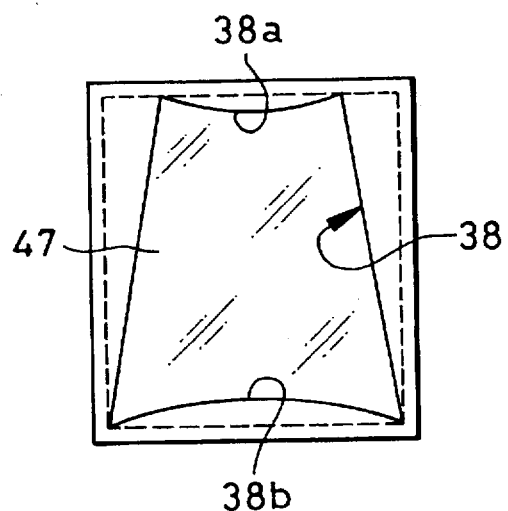
FIG. 8 is a view similar to FIG. 7, but illustrating another embodiment of the lower oblique window.
Figure 9:
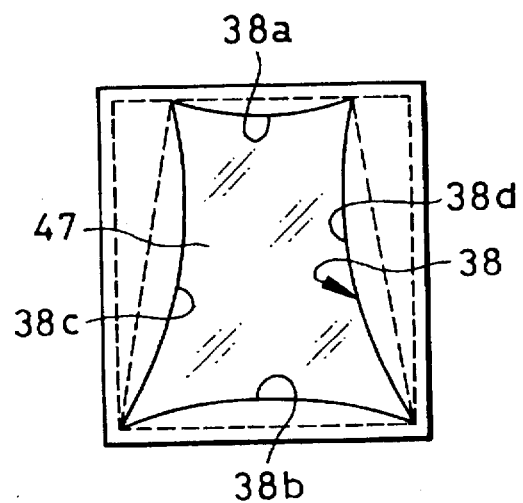
FIG. 9 is a view similar to FIG. 7, but illustrating a third embodiment of the lower oblique window.

The light reflected from the lower mirror 47 falls on the photographic film 19a which is disposed behind the exposure aperture 29 and is curved forwardly and horizontally concave due to the concave film supporting surface 30. Accordingly, the distance from the lower mirror 47 to the photographic film 19a varies even in the same horizontal plane. As a result, an image formed on the photographic film 19a has barrel form distortion along its top and bottom margins. Correspondingly, the area of the trapezoid image on the lower mirror 47 which is actually projected onto the photographic film 19a has concave top and bottom margins. Therefore, in order to minimize the internal reflection, it is more preferable to make the top and bottom margins 38a and 38b of the front oblique window 38 convex, as is shown in FIG. 8. Still more preferably, all margins 38a, 38b, 38c and 38d of the front oblique window 38 are made convex, as is shown in FIG. 9. It is possible to form the rear oblique window 37 as shown in FIGS. 7, 8 or 9, in addition to or in place of the front oblique window 38. It is also possible to make only the vertical margins of the window convex.

As shown in FIG. 3, finder lens frames 54 and 55 for holding a convex objective lens 46 and a concave ocular 53 of the Galilean viewfinder 7 in predetermined positions, are integrally formed on an upper right portion of the exposure chamber 33. The finder lens frames 54 and 55 also have an open top so that the finder lenses 52 and 53 are inserted from above into the finder lens frames 54 and 55. A top plate 56 is removably attached to the top of the finder lens frames 54 and 55 and the open top 50 of the exposure chamber 33 to close them in light-tight fashion. A mirror cover portion 57 for covering the back surface 46a of the upper mirror 46 is formed integrally with the top plate 56. The mirror cover portion 57 holds the upper mirror 46 onto the exposure chamber 33.

The finder lenses 52 and 53 are disposed between the finder objective window 7a and the finder ocular window 31 to form the viewfinder 7. The optical axis of the viewfinder 7 is disposed at the same height as the optical axis 35 of the taking lens 6, so that parallax is minimized even in a near subject distance range. The field of view of the viewfinder 7 is equal to or about 80% of the photographic field taken on the photographic film 19a.

Figure 10A:
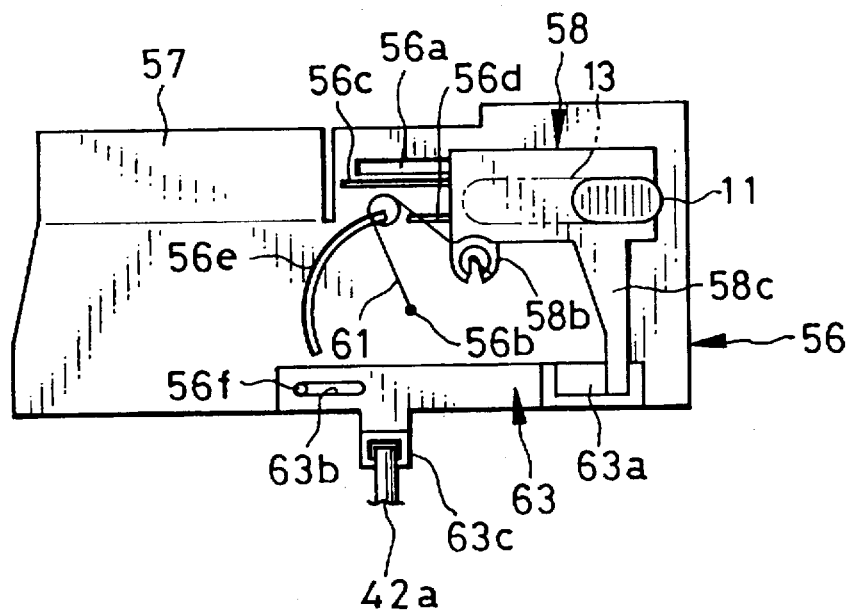
FIG. 10A is a top view of the mode switching mechanism in a daylight photography mode position.
Figure 10B:
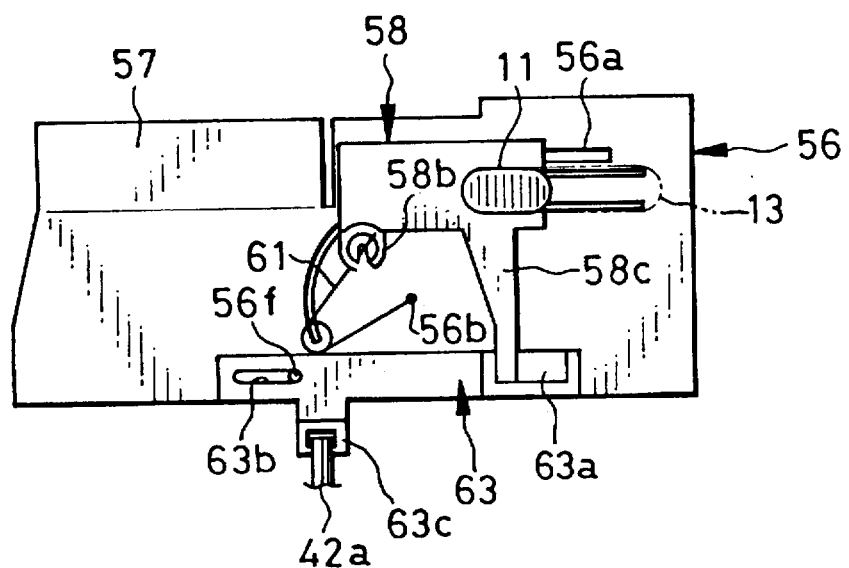
FIG. 10B is a top view of the mode switching mechanism in a night photography mode position.

As shown in detail in FIGS. 10A and 10B, a mode switching plate 58 is mounted on the top plate 56. The mode switching knob 11 and a filter frame 58a for holding the above mentioned ND or color filter 59 are formed integrally on the top and bottom side of the mode switching plate 58 respectively. The filter frame 58a with the filter 59 is inserted in a slot 56a of the top plate 56 to be slidable in a direction perpendicular to the optical axis of the viewfinder 7. The slot 56a is formed nearer to the finder ocular 53 which is smaller than the finder objective lens 52, so that a small amount of movement of the mode switching plate 58 may cause the filter 59 to move into and out of the viewfinder 7.

Figure 11A:
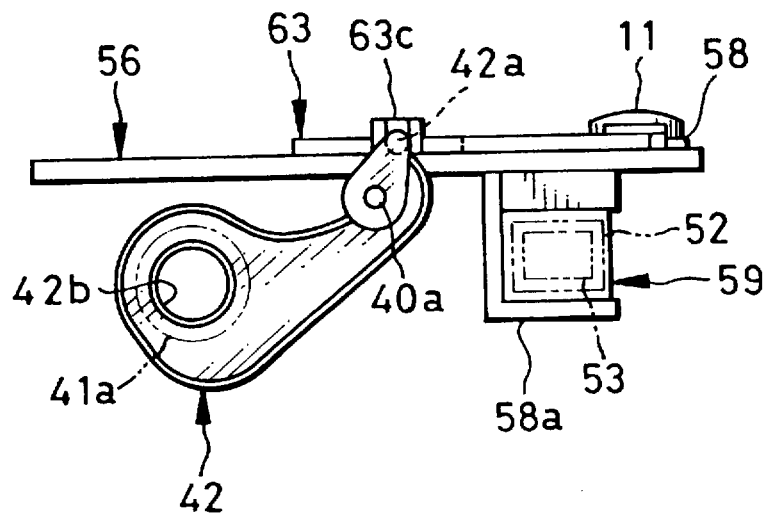
FIG. 11A is a front view of the mode switching mechanism in the daylight photography mode position.

When the mode switching knob 11 is moved into the daylight photography mode position as shown in FIG. 10A, the mode switching plate 58 is slid together to insert the filter 59 between the objective lens 52 and the ocular 53 of the viewfinder 7, as is shown in FIG. 11A. The plate 58 is urged by a toggle spring 61 toward either of the daylight and the night photography mode positions in alternative fashion. One end of the toggle spring 61 is engaged in an engaging portion 58b formed in the mode switching plate 58, while the other end of the toggle spring 61 is engaged in a hole 56b formed in the top plate 56. Rails 56c, 56d and 56e for allowing the mode switching plate 58 and the toggle spring 61 to slide thereon are formed on the top surface of the top plate.

Figure 12:
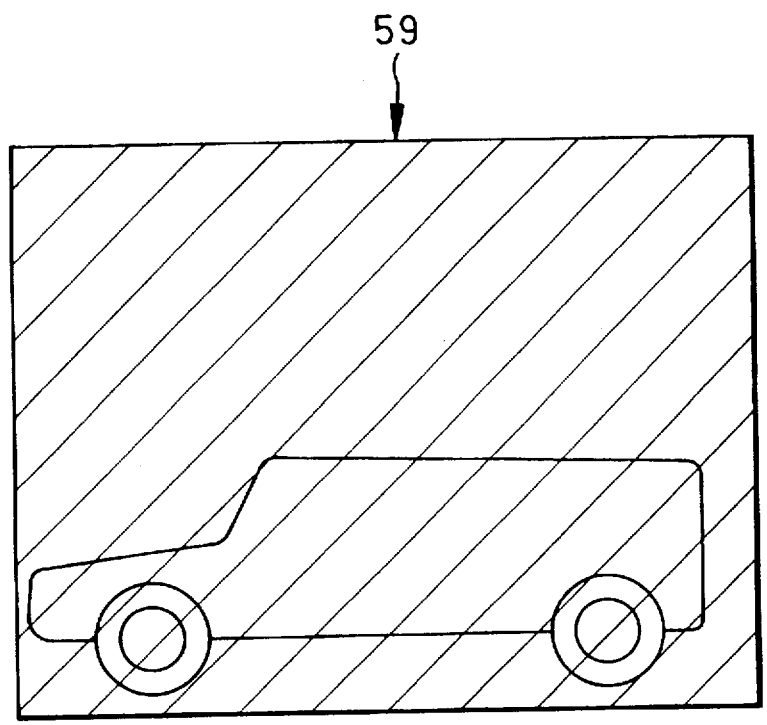
FIGS. 12A and 12B are explanatory views illustrating a high brightness subject and a low brightness subject, respectively, viewed through a filter inserted in the viewfinder of the film unit in the daylight photography mode.
Figure 12:
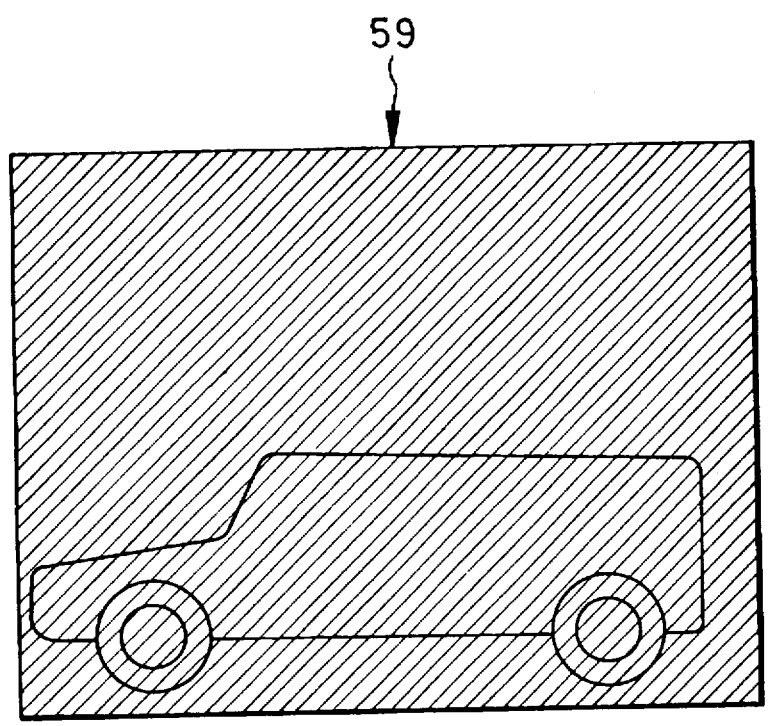
Figure 13:
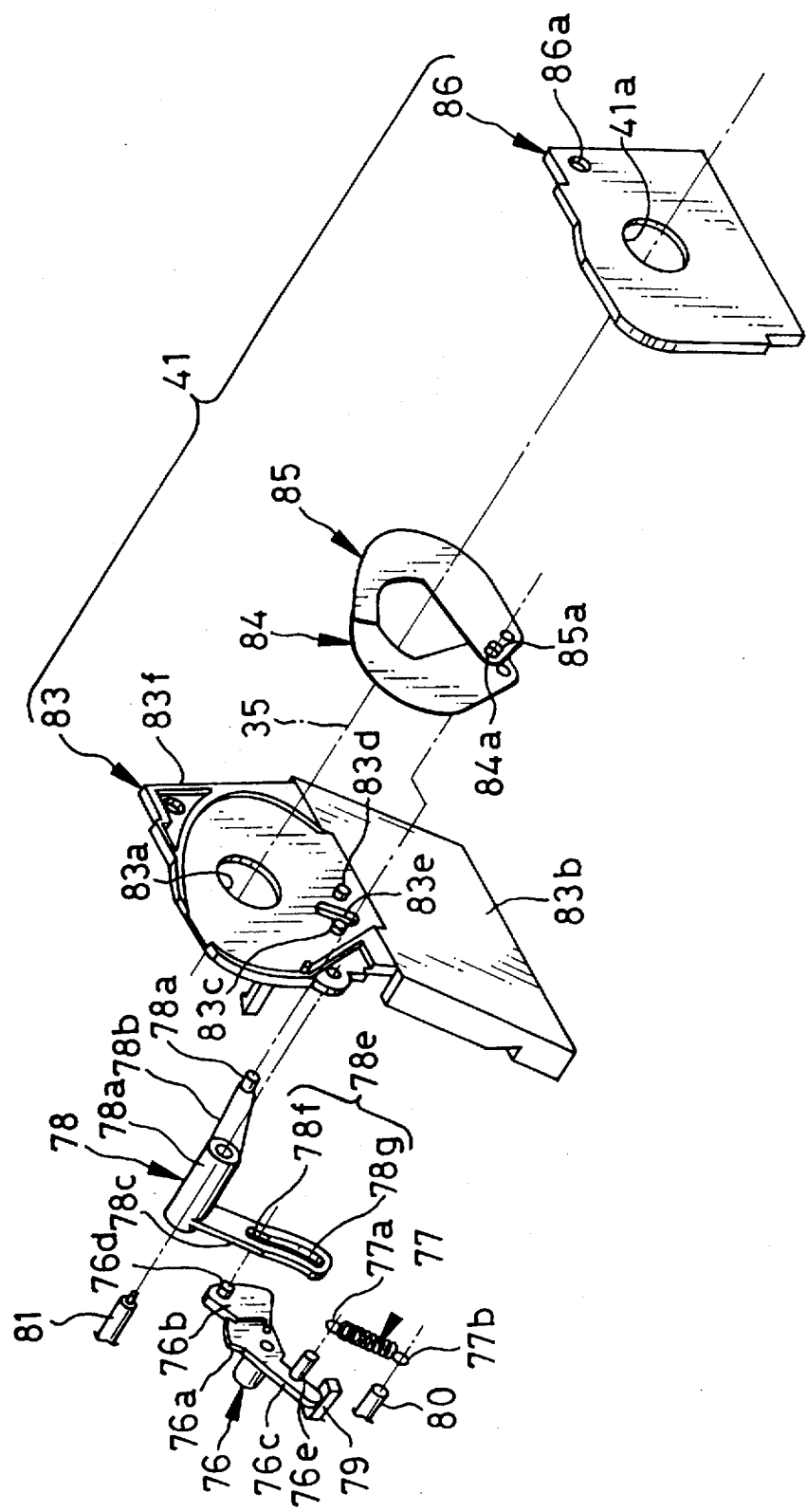
FIG. 13 is an exploded perspective view of a shutter unit incorporated in the mechanism unit shown in FIG. 3.

When the filter 59 is inserted in the viewfinder 7, the filter 59 reduces light from a subject entering through the objective lens 52 to such an extent that, so long as the subject is visible through the filter 59 of the viewfinder 7, as shown for example in FIG. 12A, the subject may be photographed in proper exposure condition in the daylight photography mode. If the subject comes to be almost invisible through the filter 59, as shown for example in FIG. 12B, the photographer understand that the night photography mode should be selected. Therefore, even a beginning photographer can appropriately select either the daylight or the night photography mode. It is possible to form the mode switching plate 58 and the filter 59 from a semi-transparent plastic material as an integral part. It is preferable to mix silicon into the plastic material of the mode switching plate 58, for smooth sliding on the top plate 56.

The lens aperture changing lever 42 is moved in cooperation with the finder filter mechanism through an interconnection plate 63. The interconnection plate 63 is mounted on the top plate 56 so as to be movable in a direction perpendicular to the optical axis of the viewfinder 7. To reduce the amount of movement of the lens aperture changing lever 42 compared with that of the mode switching plate 58, the interconnection plate 63 is coupled to the mode switching plate 58 through a loose engagement between a channel-like portion 63a and an arm 58c of the mode switching plate 58. That is, there is play in the engagement. The interconnection plate 63 also has a slot 63b which is engaged with a pin 56f formed on the top plate 56, so as to limit the sliding direction and the sliding amount of the interconnection plate 63. Since a front edge of the interconnection plate 63 is in contact with the inner surface of the front cover 16, the interconnection plate 63 can slide linearly without being rotated about the pin 56f. Therefore, the channel-like portion 63a will not be disengaged from the arm 58c.

Figure 11B:
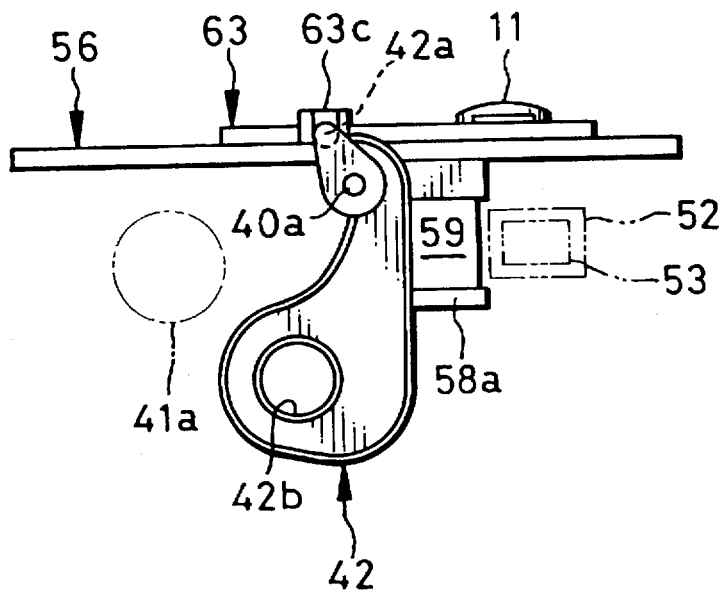
FIG. 11B is a front view of the mode switching mechanism in the night photography mode position.

A second channel-like portion 63b of the interconnection plate 63 is tightly engaged with a connection pin 42a formed at an upper tip of the lens aperture changing lever 42. The lens aperture changing lever 42 is pivotally mounted on an axle 40a which is formed on the front of the cover plate 40 parallel to the optical axis 35 of the taking lens 6, and an aperture 42b is formed on the opposite end portion of the lens aperture changing lever 42. The aperture 42b is, for example, 2 mm to 3 mm in diameter, and is placed between the shutter unit 41 and the taking lens unit 44 coaxially with the optical axis 35 of the taking lens 6 when the daylight photography mode is selected by operating the mode switching knob 11. That is, the aperture 42b defines the small lens aperture, as is shown in FIG. 11A. In the night photography mode, the lens aperture changing lever 42 is retracted from the exposure light path, as is shown in FIG. 11B.

On the upper left portion of the exposure chamber 33, there are a sprocket wheel 67, a cam unit 68, an arresting lever 69, a spring 70, a shutter actuating lever 71 and a frame number dial 72, which constitute the shutter cocking mechanism, the one frame film advancing mechanism and the frame counter mechanism. The shutter actuating lever 71 and the frame number dial 72 are pivotally mounted on an axle 73, and the arresting lever is pivotally mounted on an axle 74. The axles 73 and 74 are integrally formed with the exposure chamber 33.

An axle of the cam unit 68 is fitted in the sprocket wheel 67, the cam unit 68 and the sprocket wheel 67 are rotated by the movement of the photographic film 19a. When the cam unit 68 is rotated, the shutter actuating lever 71 and the arresting lever 69 rotate clockwise in FIG. 3. As a result, the arresting lever 69 rotates counterclockwise to lock the cam unit 68, and holds the shutter actuating lever 71 in a cocked position. The spring 70 is a torsion spring which urges the arresting lever 69 to rotate clockwise, and the shutter actuating lever 71 to rotate counterclockwise. One revolution of the cam unit 68 makes the frame number dial 72 advance one unit.

When the shutter release button 8 is depressed in this cocked position, the arresting lever 69 is pushed in the counterclockwise direction, thereby unlocking the film advancing mechanism, and the shutter actuating lever 71 is rotated in the counterclockwise direction under the force of the spring 70 to return to the initial position. At that time, a leg 71a of the shutter actuating lever 71 strikes an upper claw 76a of a connection lever 76.

The connection lever 76 transmits the movement of the shutter actuating lever 71 to the shutter unit 41 through a crank lever 78. The first connection lever 76 can swing about an axle 75 which extends in parallel to the optical axis 35. The connection lever 76 has a sector arm 76b and a projection 76c on opposite sides of the axle 75. The sector arm 76b is of a sector-shape for preventing the fluttering of the crank lever 78 and extends in a vertical plane offset slightly forward from the rest of the lever 76. A connection pin 76d is provided on the front surface of the sector arm 76b, and is connected to the crank lever 78.

A spring 77 is suspended between a pin 76e formed on the projection 76c and a pin 80 formed on the exposure chamber 33 through hooks 77a and 77b respectively, to urge the connection lever 76 to rotate in the counterclockwise direction. A stopper 79 is formed on the exposure chamber 33 to contact the projection 76c and stop the counterclockwise rotation of the connection lever 76, wherein the contact surface of the stopper 79 with the projection 76c is inclined relative to the path of the projection 76c so as to prevent the crank lever 76 from bounding back from the stopper 79.

The crank lever 78 has a bearing portion 78a which is pivotally fitted on axle 81 extending in parallel to the optical axis 35, and has two arms 78b and 78c extending radially from the bearing portion 78a. The arm 78b has a connection pin 78d which engages with a pair of shutter blades 84 and 85 of the shutter unit 41. The arm 78c slides on the sector arm 76b while the pin 76d of the sector arm 76b rides in a cam slot 78e in the arm 78c. With respect to the optical axis 35, the arm 78b is offset forward from the arm 78c so that the crank lever 78 can transmit the movement of the connection lever 76 to the shutter blades 84 and 85 which are disposed forwardly of the connection lever 76. This construction is preferable because the taking lens 6 can be disposed forwardly of the other elements while minimizing the thickness of the film unit 2. Also, the focal length of the taking lens 6 is changeable without the need for large change of the construction of the exposure mechanism. It is only necessary to adjust the length of the bearing portion 78a of the crank lever 78 to the protrusion of the taking lens 6.

The shutter unit 41 is constituted of a shutter base 83, the shutter blades of identical shape 84 and 85, and the shutter cover 78. The shutter base 83 has a shutter aperture 83i aand the shutter cover 88 has an aperture 41a, both coaxial with the optical axis 35 to define the above mentioned large lens aperture which is larger than the lens aperture 42b of the lens aperture changing lever 42. For example, the large lens aperture 41a is about 5 mm to 6 mm in diameter. The shutter base 83 also has a mirror cover portion 83b integrally formed therewith, for covering the back surface 47a of the lower mirror 47.

The shutter blades 84 and 85 are pivotally mounted on axles 83c and 83d, respectively, which are formed on the shutter base 83. The connection pin 78d of the second connection lever 78 is inserted in holes 84a and 85a of the shutter blades 84 and 85 through a slot 83e formed between the axles 83c and 83d. Accordingly, when the crank lever 78 rotates, the shutter blades 84 and 85 are rotated concurrently in opposite directions between a closed position for closing the shutter aperture 83a and an open position for opening the shutter aperture 83a to the full.

In order to achieve a suitable exposure for a low brightness subject while preventing unevenness of exposure, the cam slot 78e of the crank lever 78 has an actuating portion 78f and a keeping portion 78g. The connection pin 76d of the connection lever 76 is usually located at the top end of the actuating portion 78f, and is moved from the actuating portion 78f to the keeping portion 78g along with the rotation of the connection lever 76. The actuating portion 78f is adapted to transmit the rotational movement of the connection lever 76 to the crank lever 78 to move the shutter blades 84 and 85, whereas the keeping portion 78g is formed so as not to transmit the rotational movement of the connection lever 76 to the crank lever 78, as will be described in detail below. So long as the connection pin 76d is located in the keeping portion 78g, the shutter blades 84 and 85 are kept opened.

Figure 14:
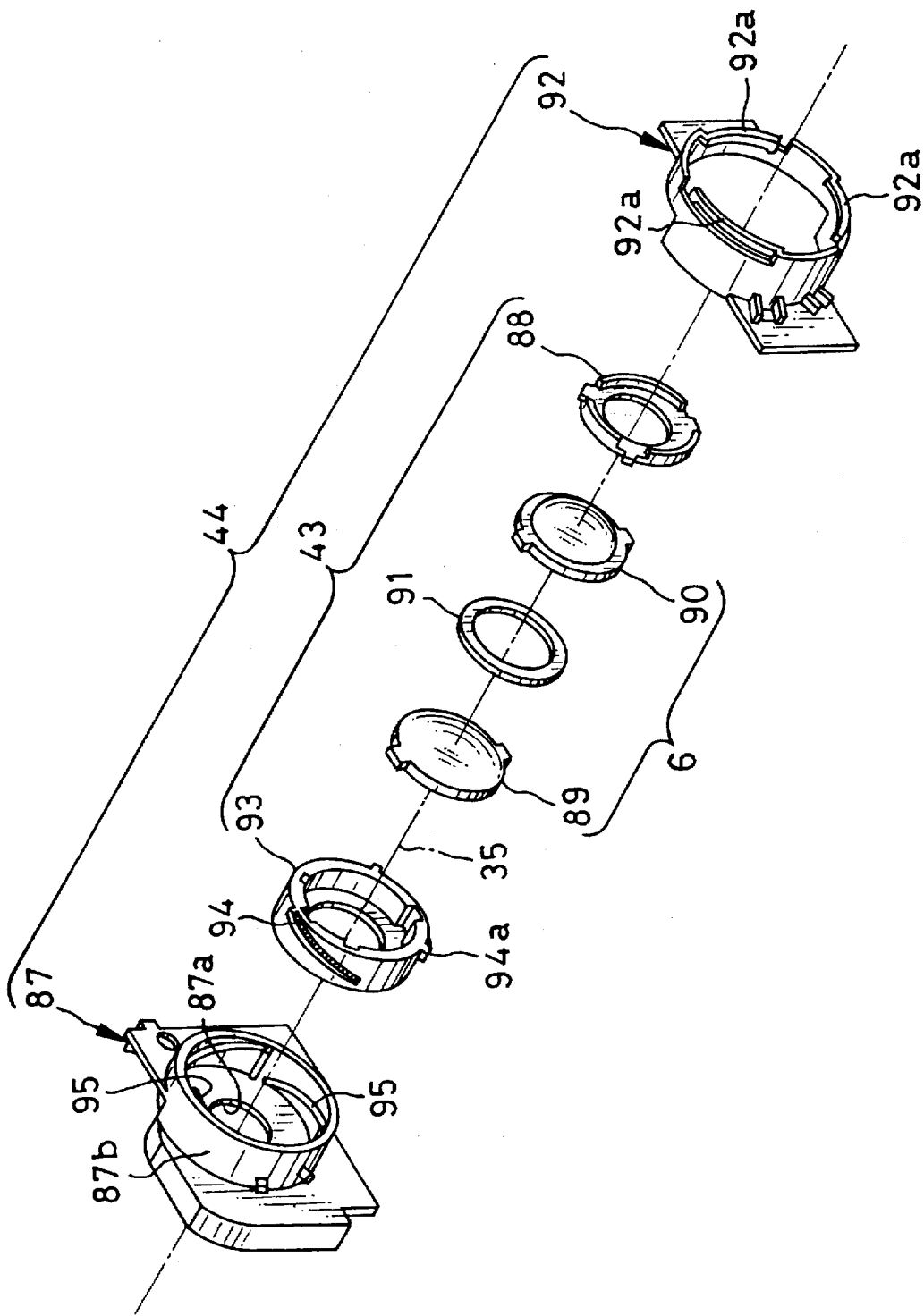
FIG. 14 is an exploded perspective view of a taking lens unit incorporated in the mechanism unit shown in FIG. 3.

As shown in FIG. 14, the taking lens unit 44 is constituted of a lens base 87, a lens assembly 43 and a lens cover 92, and is removably secured to the front of the shutter unit 41. The lens assembly 43 is constituted of two plastic lenses 89 and 90, and a spacer ring 91 disposed between the rear and front lenses 89 and 90, which are held in a lens frame 93 and fixed therein by a force-fit ring 88 which is force fitted in the lens frame 93 in front of the front lens 90.

The lens base 87 has an aperture 87a and a lens barrel portion 87b for holding the lens assembly 43 therein. The lens frame 93 has three spiral ridges 94 on the outer periphery thereof, which are slidably fitted on three spiral cam rails 95 which are formed on the inside surface of the lens barrel portion 87b. Thanks to this construction, the lens assembly is moved axially inside the lens barrel portion 87a when it is rotated. As shown in detail in FIG. 15, the three ridges 94 each has a plurality of stepped portions or teeth 94a along the opposite side from the cam rails 95. Three resilient hooks 92a are formed around the rim of a barrel portion of the lens cover 92 to be engaged with the teeth 94a of the ridges 94.

The teeth 94a are spaced equally to provide a pitch of 4°, that is, 1/90 of one revolution of the lens frame 93. The cam rails 95 and the ridges 94 are inclined such that one pitch of movement of the teeth 94a relative to the hooks 92a corresponds to a predetermined amount, e.g. 0.2 mm, of axial movement of the lens assembly 43 in the lens barrel portion 87c. Thus, the lens assembly 43 can move by 0.2 mm in the axial direction corresponding to the rotational movement thereof, the focus of the taking lens 6 is easy and finely adjustable. The relative position between the hooks 92a and the ridges 94 and the cam rails 95 are unchanged while the lens frame 93 is rotated. Therefore, no excessive load is applied to the hooks 92a, so that the lens cover 92 can be maintained reusable at a high efficiency. In addition, it is unnecessary to provide a spring especially for securing the lens assembly 43.

Figure 16:
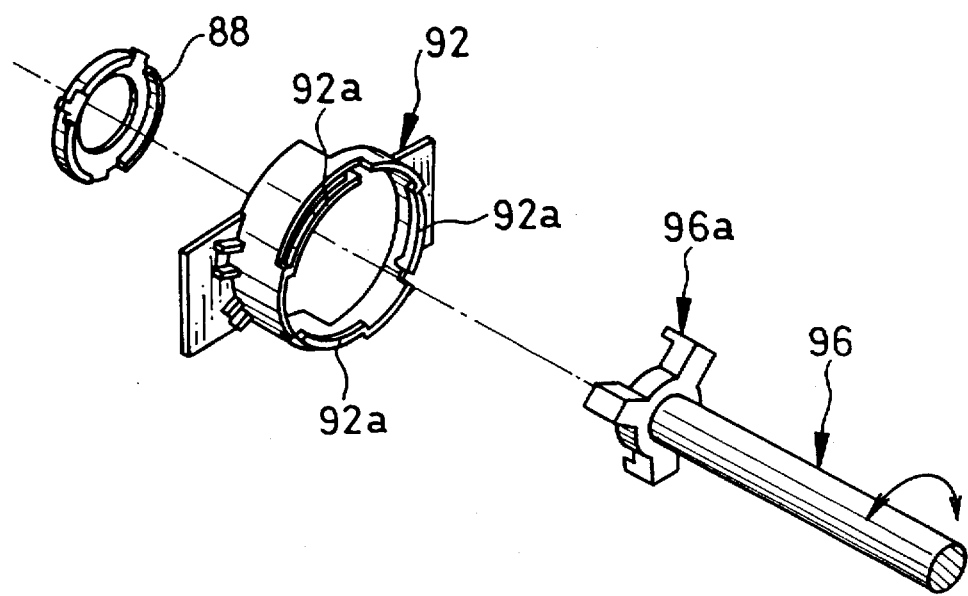
FIG. 16 is an explanatory view illustrating a method of fine adjustment of the focus in the taking lens unit shown in FIG. 14.

The focus of the taking lens 6 is adjusted after the mechanism unit 17 is mounted to the main body 15, by means of a tool 96 as shown in FIG. 16. The tool 96 has a three-forked end 96a which is inserted forwardly of the lens cover 92 and is engaged with the force-fit ring 88 so as to rotate the lens assembly 43.

When the lens assembly 43 is rotated clockwise in FIG. 16, the ridges 94 slide on the cam rails 95 to move the lens assembly 43 forward in the lens barrel portion 87c while the hooks 92a click to engage with the next teeth 94a. When the lens assembly 43 is rotated counterclockwise, the lens assembly 43 moves rearward in the lens barrel portion 87c. Each time the hooks 92a come into engagement with the next teeth 94a, the lens assembly 43 has moved 0.2 mm in the axial direction and is stopped at that position.

Figure 15:
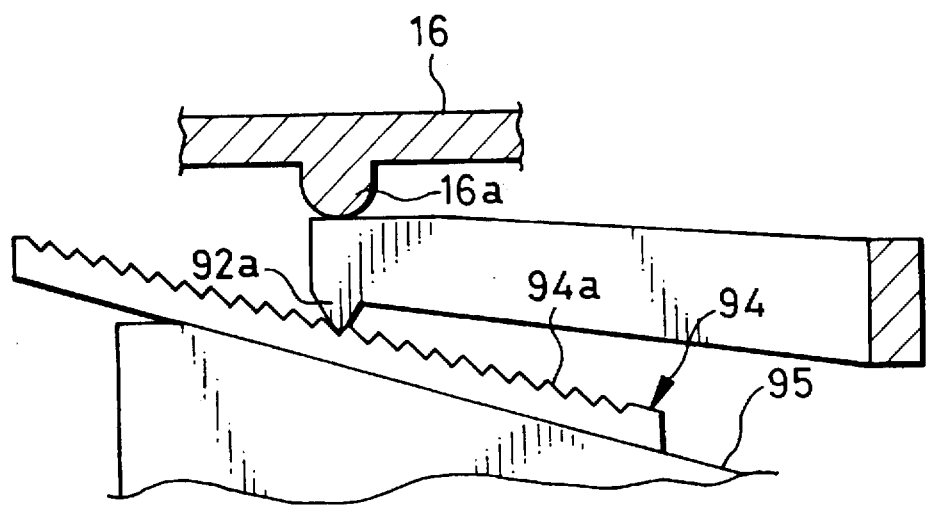
FIG. 15 is an explanatory view illustrating a mechanism for fine adjustment of the focus of the taking lens, provided in the taking lens unit.

For the fine adjustment of the focus of the taking lens 6, a laser beam is projected onto the front of the taking lens 6 to check if the focus is in a proper position. After the fine adjustment of the focus is completed, the front cover 16 is attached to the main body 15. Thereafter, the photographic film cassette 19 is loaded in the main body 15 in the manner as described above. As shown in FIG. 15, bosses 16a are formed on the inner surface of the front cover 16 correspondingly to the hooks 92a, so that the bosses 16a press the hooks 92a onto the teeth 94a when the front cover 16 is attached to the main body 15. Accordingly, even if the film unit 2 gets a shock, the lens assembly 43 will not be rotated to displace the focus of the taking lens 6 relative to the photographic film 19a.

Figure 17A:
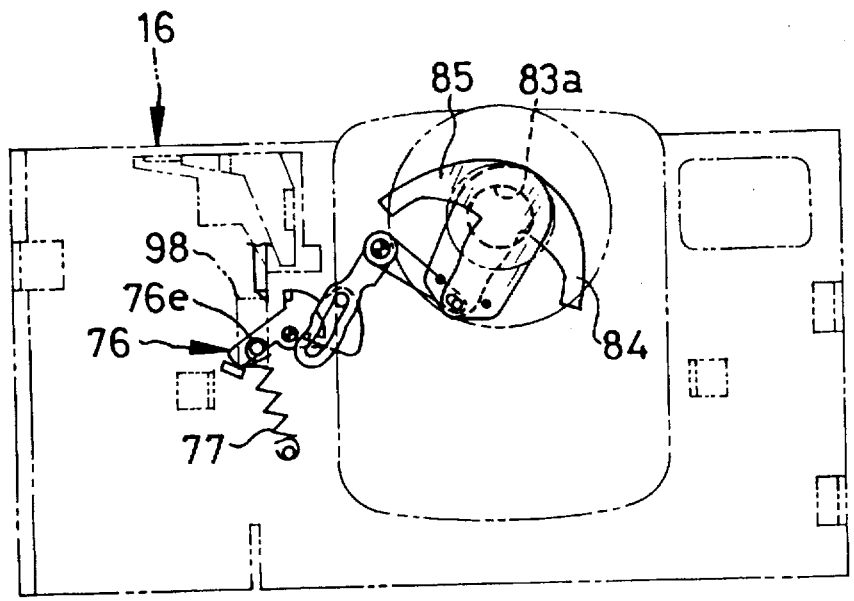
FIGS. 17A and 17B are explanatory front views of the film unit illustrating a shutter operating with a pin which is exposed to the outside through an opening formed through a front cover of the film unit.
Figure 17B:
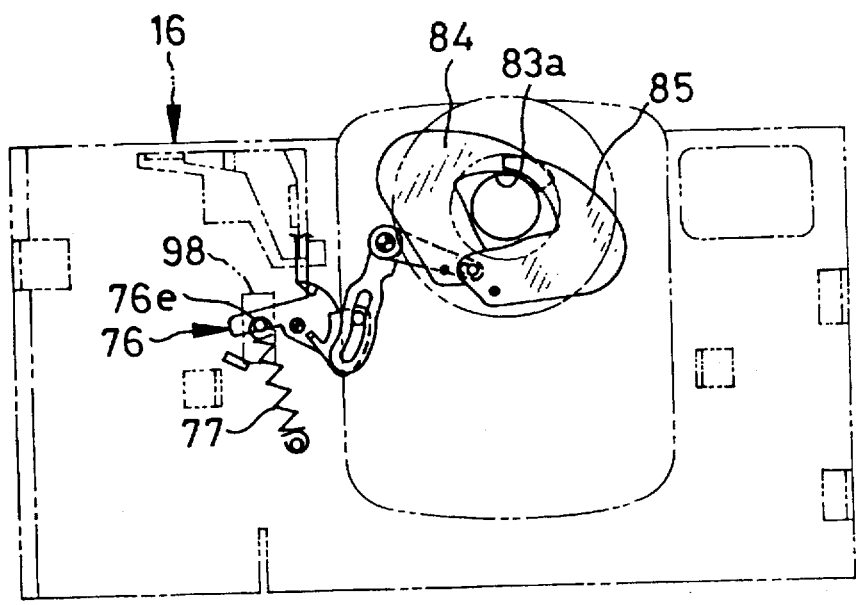

To permit inspection of the focus of the taking lens 6 after the front cover 16 is attached, it is necessary to enable the shutter blades 84 and 85 to be opened for a sufficient time enough for the inspection, by an operation from the outside of the front cover 16. Therefore, the front cover 16 is provided with an opening 98 for exposing the connection pin 76e of the connection lever 76 to the outside, as is shown in FIG. 17A. By moving the pin 76e up and down through the opening 98, the shutter blades 84 and 85 can be opened for an appropriate time, as is shown in FIG. 17B.

Figure 18:
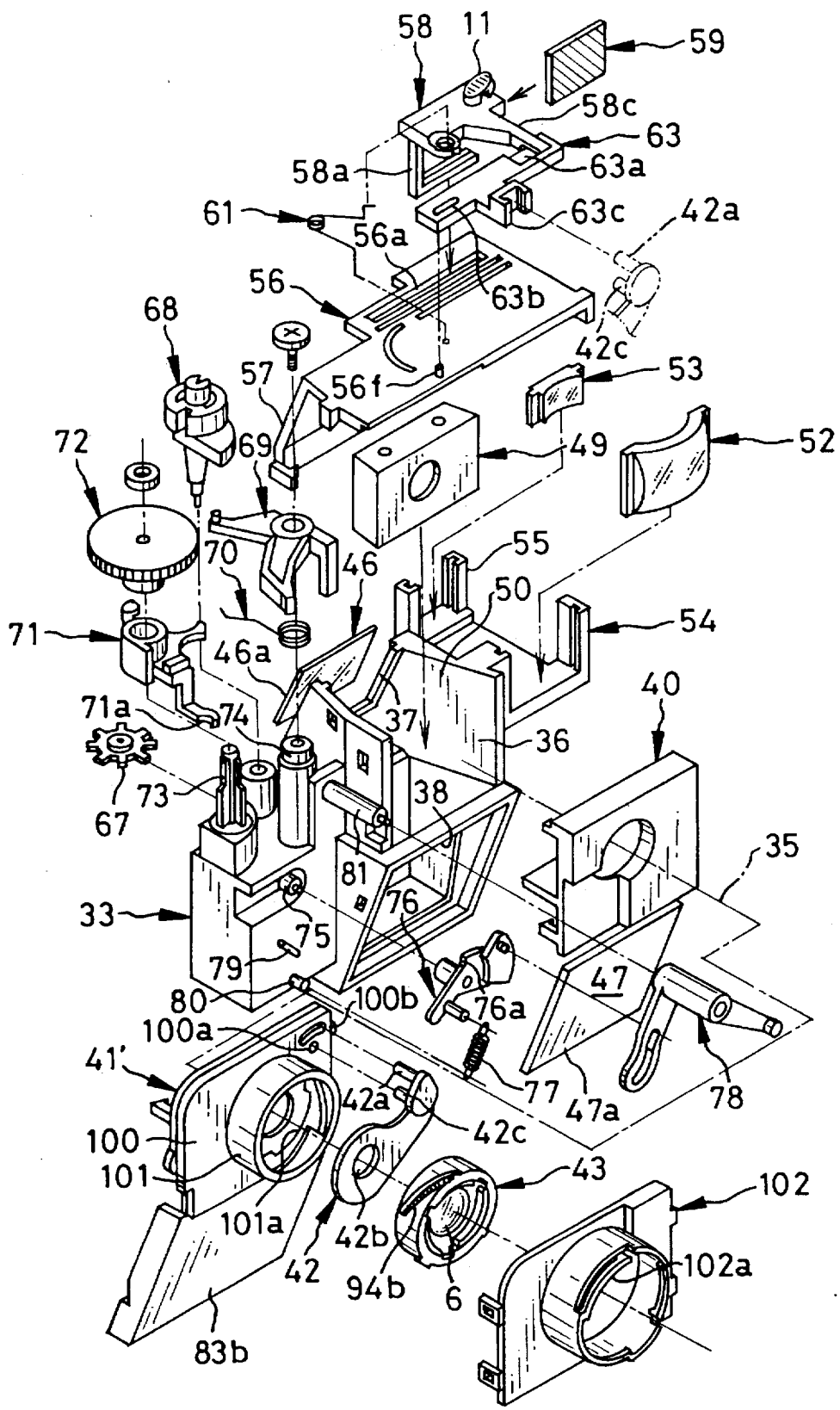
FIG. 18 is an exploded perspective view of a mechanism unit according to another preferred embodiment of the invention.
Figure 19:
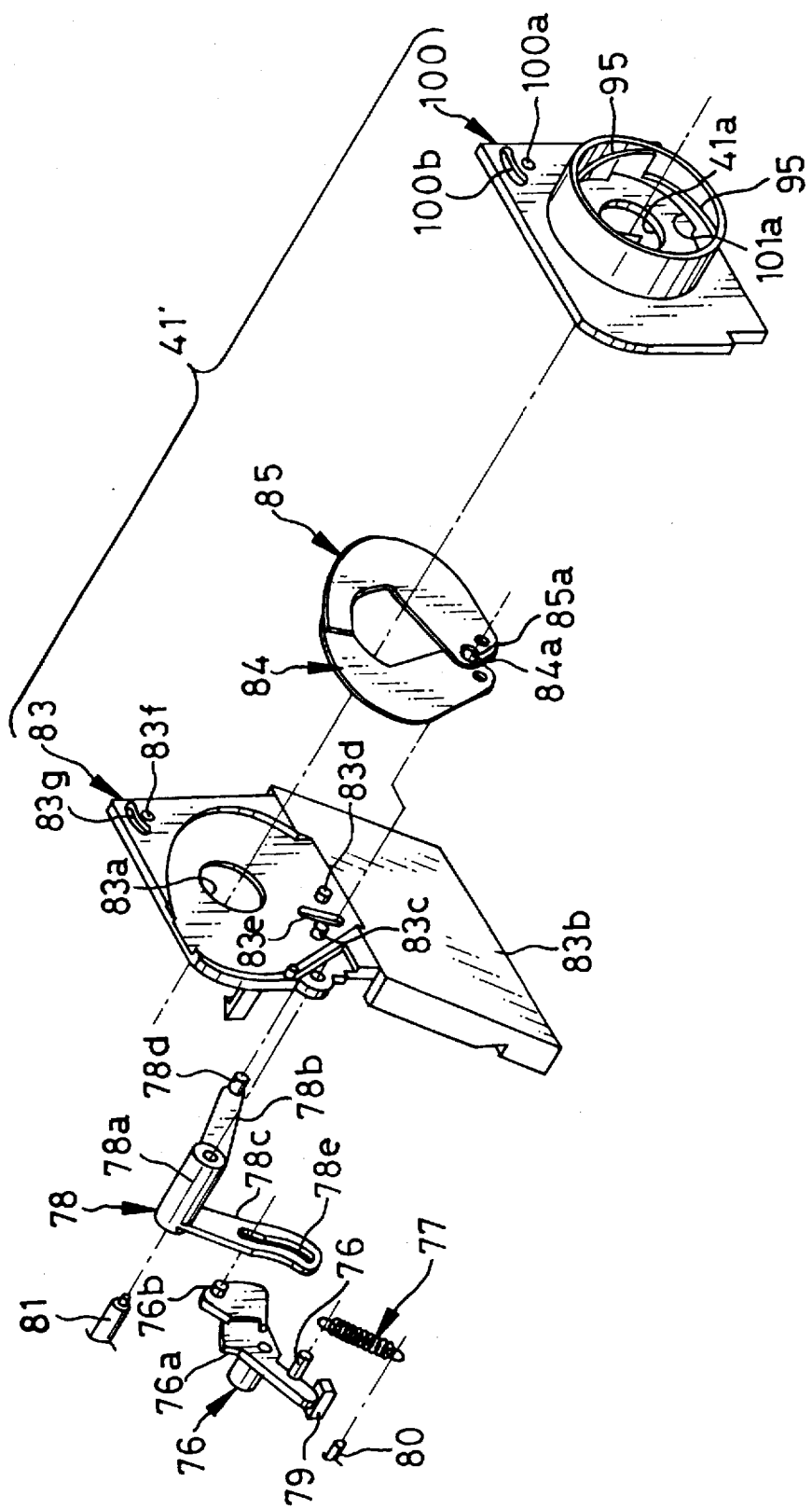
FIG. 19 is an exploded perspective view of a shutter unit incorporated in the mechanism unit shown in FIG. 18.
Figure 20:
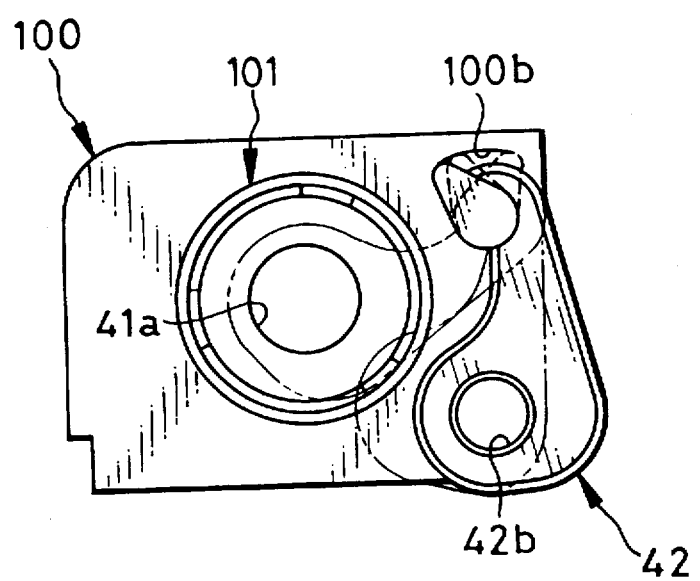
FIG. 20 is a front view of the shutter unit shown in FIG. 19, with a lens aperture changing lever mounted thereto.

FIGS. 18 to 20 show a mechanism unit according to another preferred embodiment, wherein a lens aperture changing lever 42 has a connection pin 42a at its upper tip which is engaged with a channel-like portion 63b of an interconnection plate 63 to be moved in cooperation with a mode switching plate 58 in the same way as the first embodiment shown in FIG. 3, but a pivot 42c is formed on the lever 42 below the connection pin 42a. The pivot 42c is inserted in a bearing hole 100a of a shutter cover 100, while the connection pin 42a is engaged with the channel-like portion 63 through an arched slot 100b. Thus, the connection pin 42a may move through the slot 100b along with the interconnection plate 63 to rotate the lens aperture changing lever 42 about the pivot 42c. Thereby, a small lens aperture 42b formed in a lower end portion of the lever 42 is moved into and out of the light path of a taking lens 6 between a lens assembly 43 and a shutter unit 41'.

The shutter unit 41' is constituted of a shutter base 83, a pair of shutter blades 84 and 85 and the shutter cover 100, as is shown in FIG. 19. The shutter base 83 has a bearing hole 83f and an arched slot 83g in correspondence with the bearing hole 100a and the arched slot 100b of the shutter cover 100. Also, a lens barrel portion 101 is integrally formed with the shutter cover 100, surrounding a large lens aperture 41a and protruding forwardly to accept the lens assembly 43 therein. The lens aperture changing lever 42 may protrude into the lens barrel portion 101 through a slit 101a formed through a bottom rim of the lens barrel portion 101.

The lens barrel portion 101 has three spiral cam rails 95 formed on its inside surface, on which three spiral ridges 94 on the outer periphery of the lens assembly 43 are slidable fitted on their one sides. Thanks to this construction, the lens assembly 43 is moved axially inside the lens barrel portion 101 when it is rotated. The three ridges 94 each has a plurality of stepped portions or teeth 94a along the opposite side from the cam rails 95. Three resilient hooks 102a are formed around the top rim of a barrel portion of the lens cover 102 so as to be engaged with the teeth 94a of the ridges 94, when the lens cover 102 is attached to the front of the shutter cover 100 through snap-in engagement.

When mounting the lens aperture changing lever 42 to the lens cover 100, the connection pin 42a and the pivot 42c of the lens aperture changing lever 42 are inserted in the arched slot 100b and the bearing hole 100a while orienting the lens aperture changing lever 42 so as not to interfere with the lens barrel portion 101, as is shown by solid lines in FIG. 20. Thereafter, when the lens aperture changing lever 42 is swung clockwise in FIG. 20, the bottom end portion with the small lens aperture 42b is inserted in the slit 101a of the lens barrel portion 101, as is shown by phantom lines in FIG. 20. To enable the lens aperture changing lever 42 to pivot apart from the lens barrel portion 101 to such an extent that the lever 42 and the lens barrel portion 101 do not interfere with each other, the arched slot 100b extends beyond the range of movement of the connection pin 42a that is caused by the interconnection plate 63. Other constructions of the embodiment shown in FIG. 18 may be equal or equivalent to the embodiment shown in FIG. 3, so that same or like elements are designated by the same reference numerals to omit redundant description.

Now the operation of the above embodiments will be described.

The film unit 2 is delivered from the factory while being initially set in the daylight photography mode. In the daylight photography mode, the mode switching knob 11 is placed in the right end of the slot 13 in FIG. 10A, so that the interconnection plate 63 is moved in a right hand position by the arm 58c of the mode switching plate 58 which is engaged in the channel-like portion 63a. In this state, the small lens aperture 42b of the lens aperture changing lever 42 is placed coaxially with the optical axis 35 in front of the large lens aperture 41a. Also the filter 59 is inserted between the finder lenses 52 and 54. Since the toggle spring 61 urges the mode switching plate 58 toward the daylight photography mode position, the mode switching plate 58 is hardly moved by accident.

To take a picture, first the film advancing wheel 10 is to be rotated to cock the shutter. Since the shutter actuating lever 71 has initially been set in a position slightly before the cocked position, a little amount of winding of the photographic film 19a causes the shutter actuating lever 71 to set in the cocked position through the sprocket wheel 67, the cam member 68 and the arresting lever 69. In the cocked position, the sprocket wheel 67 is locked to stop rotating. Since the film unit 2 is initially set in the daylight photography mode, the brightness of a photographic field viewed through the viewfinder 7 is reduced by the filter 59. Thus alerted, even a beginning photographer would recognize the film unit 2 as the mode-changeable type from the information printed on the outer casing 4 or from a glance at the symbols 4a and 4b.

Thereafter when the shutter button 8 is depressed, the arresting lever 69 is pushed counterclockwise in FIG. 3 or 18 to permit the shutter actuating lever 71 to rotate counterclockwise under the force of the spring 70 from the cocked position to a released position. Simultaneously, the sprocket wheel 67 is unlocked.

Figure 21:
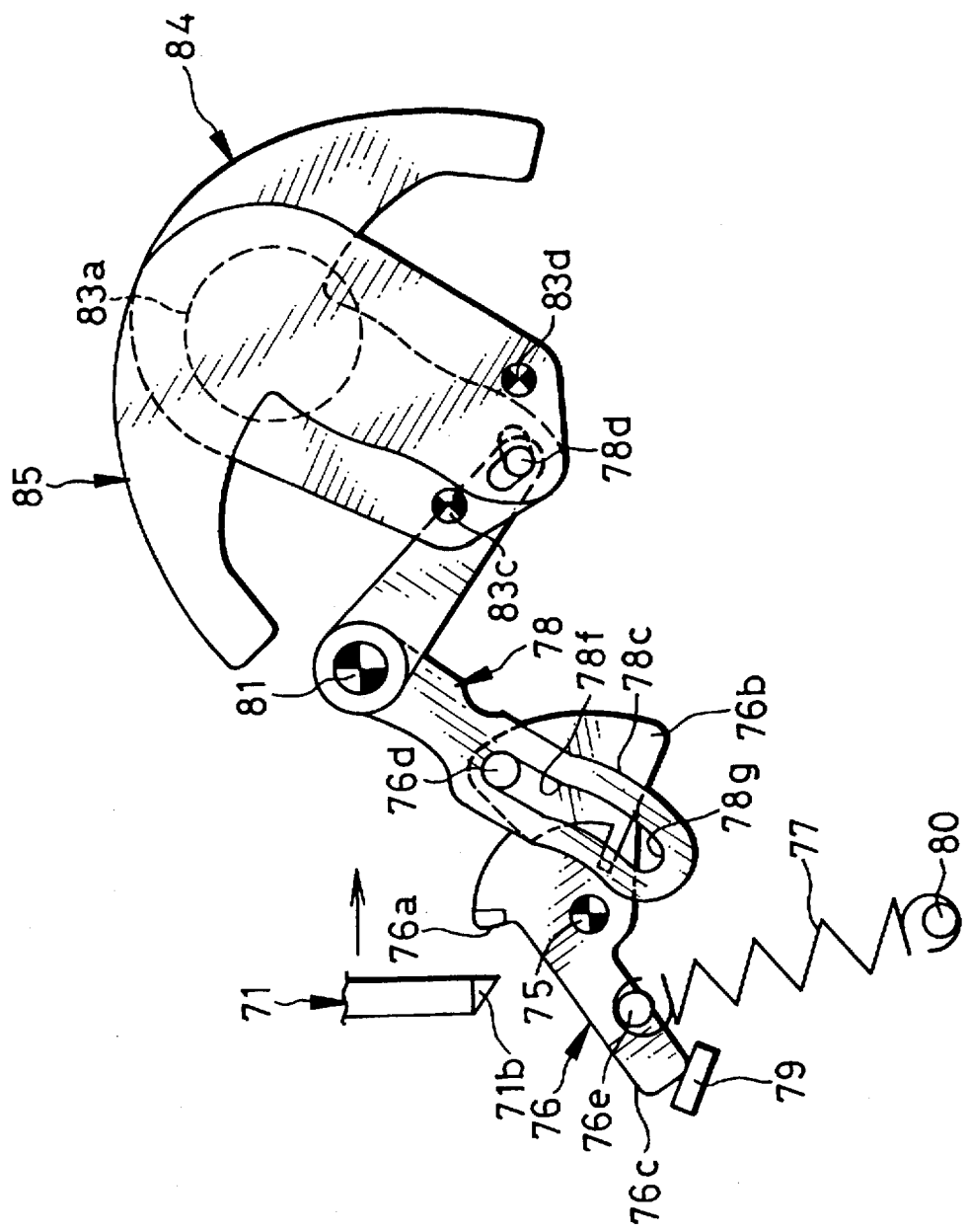
FIGS. 21 to 23 are explanatory views illustrating the operation of the shutter mechanism of the embodiments shown in FIGS. 13 and 19.

In the cocked position of the shutter actuating lever 71, the shutter mechanism is disposed as shown in FIG. 21. That is, the connection lever 76 is urged by the spring 77 to rotate counterclockwise about the axle 75, but is stopped with the projection 76c contacting against the stopper 79. The connection pin 76d is located at the upper end of the actuating portion 78f of the cam slot 78e. Thus, the shutter blades 84 and 85 are in the closed position.

Figure 22:
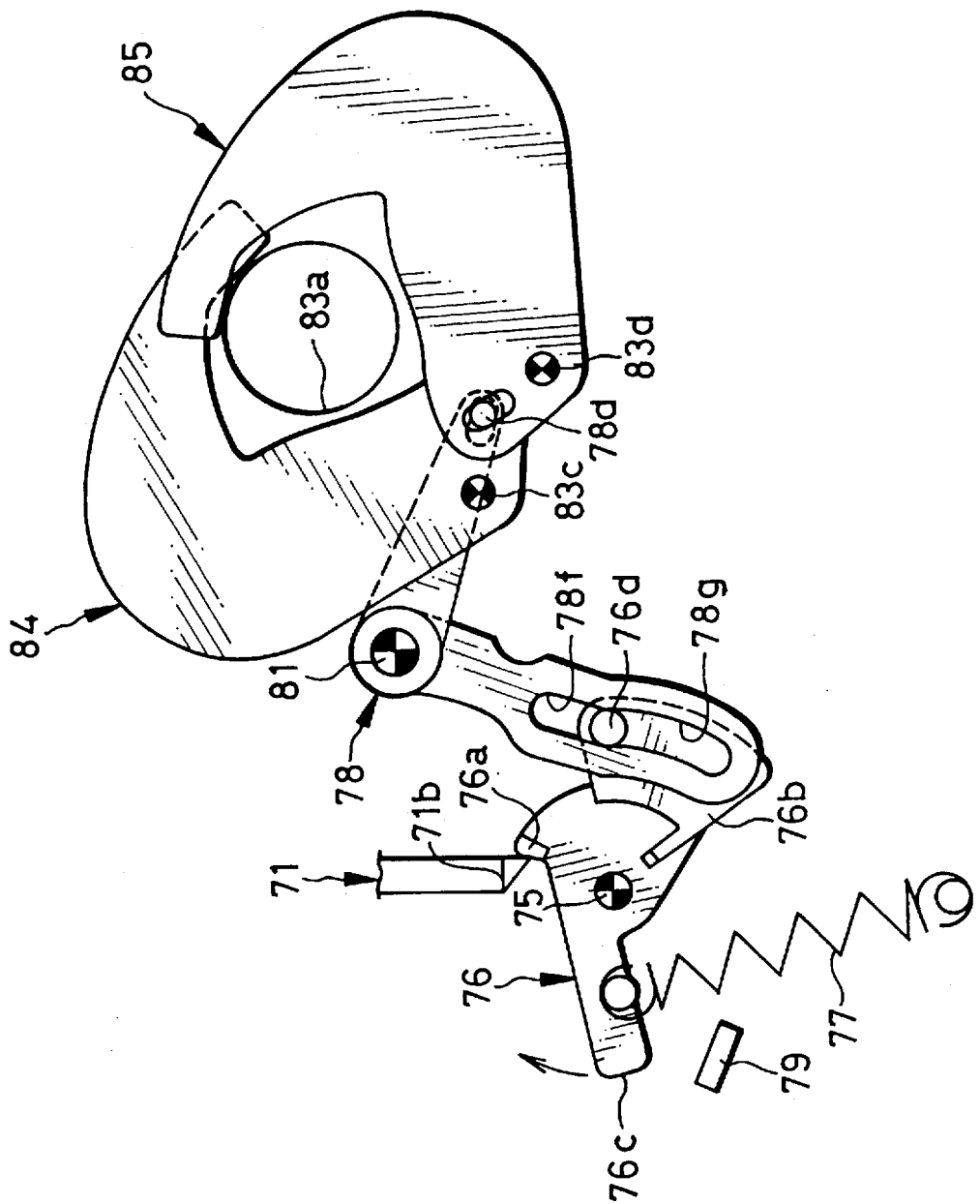

During the movement of the shutter actuating lever 71 from the cocked position to the released position, the leg 71b strikes the upper claw 76a of the connection lever 76 to rotate the same clockwise against the force of the spring 77. As a result, the connection pin 76d moves to the lower end of the actuating portion 78f to rotate the crank lever 78 counterclockwise about the axle 81. Thereby, the shutter blade 84 is rotated counterclockwise about the axle 83c, while the shutter blade 85 is rotated clockwise about the axle 83d. When the connection pin 76d reaches the lower end of the actuating portion 78f, the shutter blades 84 and 85 reach the open position where the shutter aperture 83a is fully opened, as is shown in FIG. 22. Thanks to the ambidextrous movement of the shutter blades 84 and 85 as well as the accelerating effect of the crank lever 78, the shutter blades 84 and 85 are rapidly moved to the open position by a small mount of rotation of the connection lever 76. Therefore, unevenness of exposure is prevented.

Figure 23:
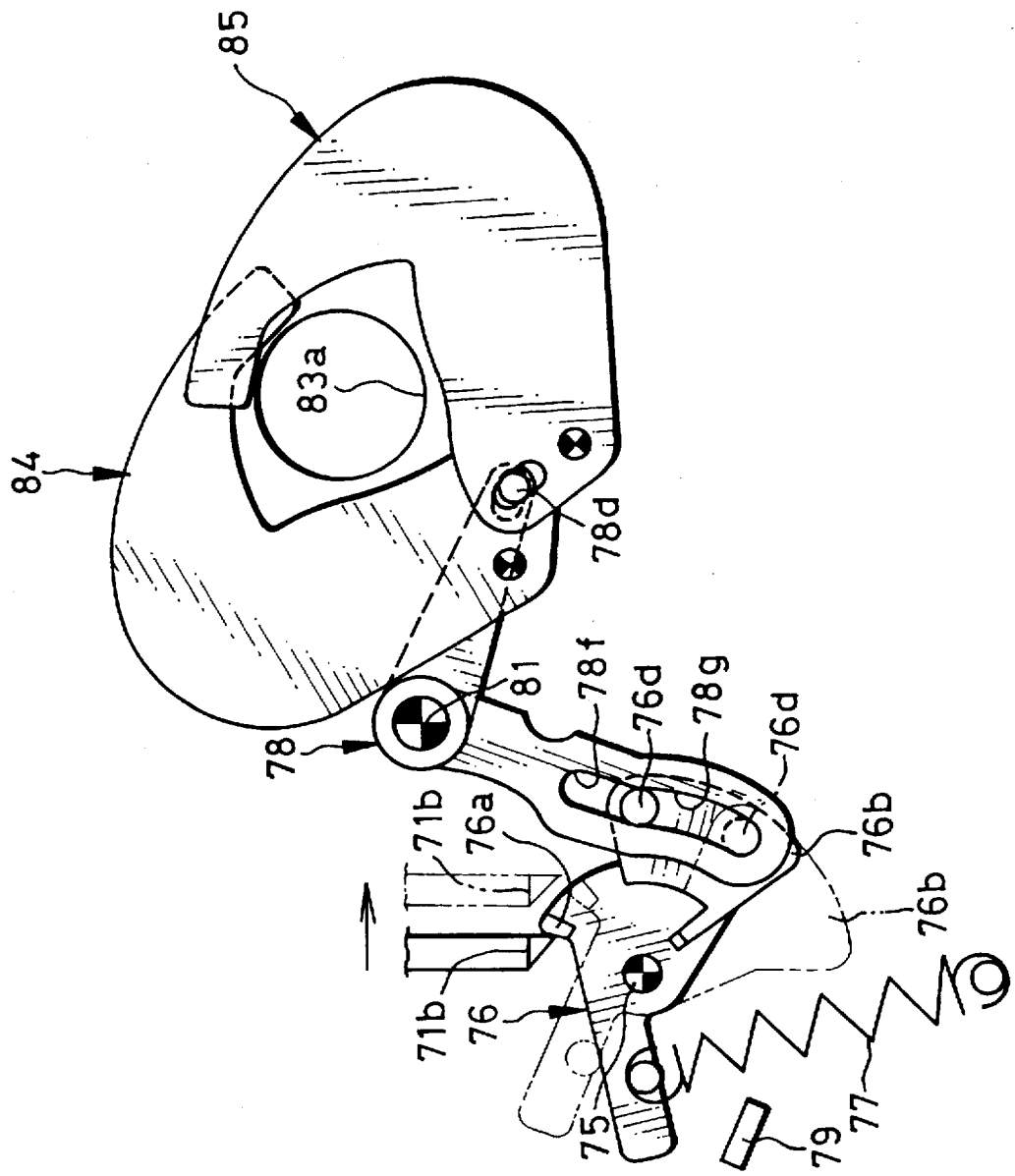

Thereafter, the leg 71b further pushes the upper claw 76a, the connection lever 76 is rotated clockwise into a position shown by phantom lines in FIG. 23, while the connection pin is moved along the keeping portion 78g of the cam slot 78e into the bottom end of the keeping portion 78g. The keeping portion 78g is curved such that, after the crank lever 78 is moved in the position as shown in FIG. 22, the keeping portion 78g extends along a circle which corresponds to the course of rotation of the connection pin 76 about the axle 75. Accordingly, while the connection pin 76d is in the keeping portion 78g, the crank lever 78 is not rotated from the position as shown in FIG. 22, and hence the shutter blades 84 and 85 are kept opened, as is shown in FIG. 23.

At the moment when the leg 71b gets over the upper claw 76a, the connection lever 76 returns to the initial position under the force of the spring 77, so that the connection pin 76d returns to the uppermost portion of the keeping portion 78g, as shown by solid line in FIG. 23. Because this movement of the connection pin 76d along the keeping portion 78g does not yet cause the crank lever 78 to rotate, the shutter blades 84 and 85 are kept opened. Upon the connection pin 76d moving into the actuating portion 78f, the crank lever 78 rotates clockwise about the axle 81 to swing the shutter blades 84 and 85 toward the closed position. When the connection lever 76 returns to the initial position, as shown in FIG. 21, the shutter blades 84 and 85 are set back in the closed position, while the projection 76c contacts against the stopper 79. Due to the inclination of the stopper 79 relative to the moving direction of the projection 76c, the connection lever 76 does not bound back on the stopper 79, to prevent double-exposure.

While the shutter blades 84 and 85 open the shutter aperture 83a, light from the subject enters through the taking lens 6, the small lens aperture 42b and the shutter aperture 83a in the daylight photography mode. The light travels through the light-shielding barrel 49, and then is reflected from the upper mirror 46 toward the lower mirror 47. The lower mirror 47 reflects the light toward the rear window 39 which is aligned with the exposure aperture 29. Thus, the photographic film 19a behind the exposure aperture 29 is exposed to the light. Since the light has passed through the small lens aperture 42b, the consequent exposure value is suitable for the subject which is in a high brightness level in the daylight.

If the brightness of the subject is too low to permit viewing through the light-reducing filter 59, e.g., as shown in FIG. 12A, the mode switching knob 11 is slid to the left to switch the film unit 2 to the night photography mode, as is shown in FIG. 10B. Then, the arm 58c slides in the channel-like portion 63a to the left and then pushes the interconnection plate 63 to the left, so that the interconnection plate 63 is moved to the left by an amount less than that of the mode switching plate 58, while being guided by the pin 56f along the slot 63b as well as by the inner surface of the front cover 16.

When the mode switching lever 58 is slid to the left, the filter 59 is retracted from the optical system 52 and 53 of the viewfinder 7, as is shown in FIG. 11B. Concurrently, along with the interconnection plate 63 sliding to the left, the lens aperture changing lever 42, which is coupled to the interconnection plate 63 through the connection pin 42a, is rotated counterclockwise to retract the small lens aperture 42b from the optical path of the taking lens 6. In this way, the photographer can view the subject through the viewfinder 7. When the shutter button 8 is depressed in this condition, the shutter blades 84 and 85 are opened and then closed to expose the photographic film 19a through the taking lens 5 and the large lens aperture 41a. The large lens aperture 41a allows to achieve an exposure value suitable for the low brightness subject in combination with the above-described cam slot 78e which keeps the shutter blades 84 and 85 in the open position for a sufficient time enough to obtain the suitable exposure for the low brightness subject while preventing unevenness of exposure.

In this way, the photographer can appropriately select either the daylight photography mode or the night photography mode by means of the mode switching knob 11 before or after advancing the photographic film 19a. When all available frames have been exposed, the film unit 2 is forwarded to a photo-lab, without removing the film cassette 19 therefrom. In the photo-lab, the film cassette 19 is removed from the unit body 3, and the exposed photographic film 19a is removed from the cassette shell 19b for development and printing. The resulting photo-prints and the developed photographic film 19a are returned to the photographer. The empty unit body 3 is recovered by the manufacturer for recycling or reuse.

Although the rotational movement of the connection lever 76 is limited by the stopper 79, it is instead possible to provide a stopper which will contact the lever 78b or the lever 78c to stop the crank lever 78. Also in those modifications, it is preferable to orient the stopping or contacting surface of the stopper diagonal to the moving direction of the crank lever 78, in order to prevent the bounding.

In the above-described embodiments, the cam slot 78e has a width slightly larger than the diameter of the connection pin 76d. Therefore, if any obstacle such as dust or sand should clog between the cam slot 78e and the connection pin 76d, the shutter blades 84 and 85 could become immovable. To avoid such trouble, excluding an actuating cam surface 78h extending in a range R1 which is necessary for the connection pin 76d to rotate the crank lever 78 and a keeping cam surface 78i extending in a range R2 which is necessary for keeping the shutter blades 84 and 85 in the open position, a cam slot 78e preferably has reliefs or slack portions 78j and 78k, as shown by hatching in FIG. 24, so as not to contact with the connection pin 76d in those ineffective portions.

Figure 25:
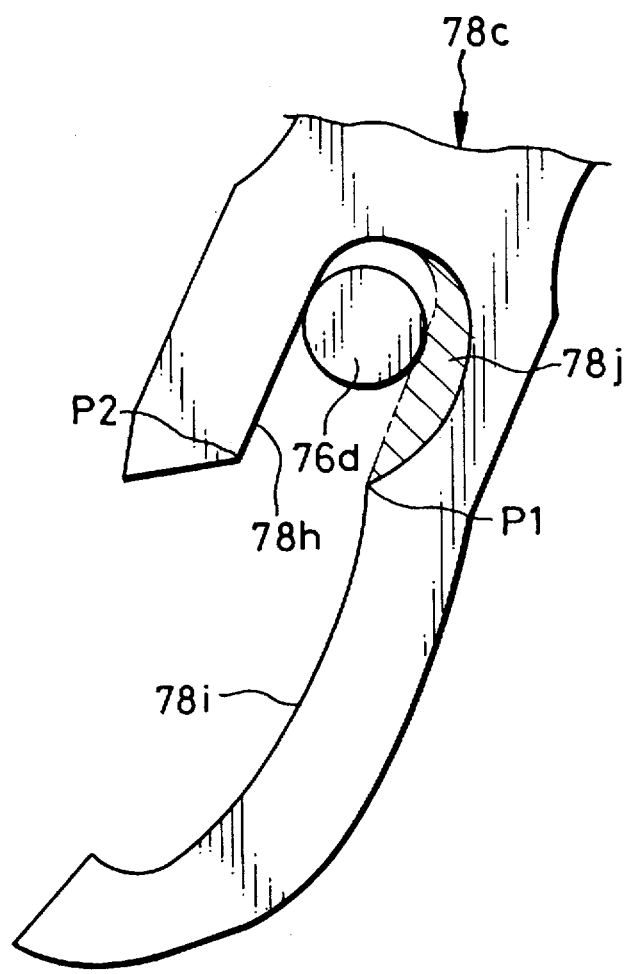
FIG. 25 is an explanatory view of a cam slot according to another embodiment of the invention.

To achieve the same effect, it is also preferable to cut off the ineffective and hence unnecessary portion opposing to the keeping cam surface 78i, as is shown in FIG. 25.

Figure 24:
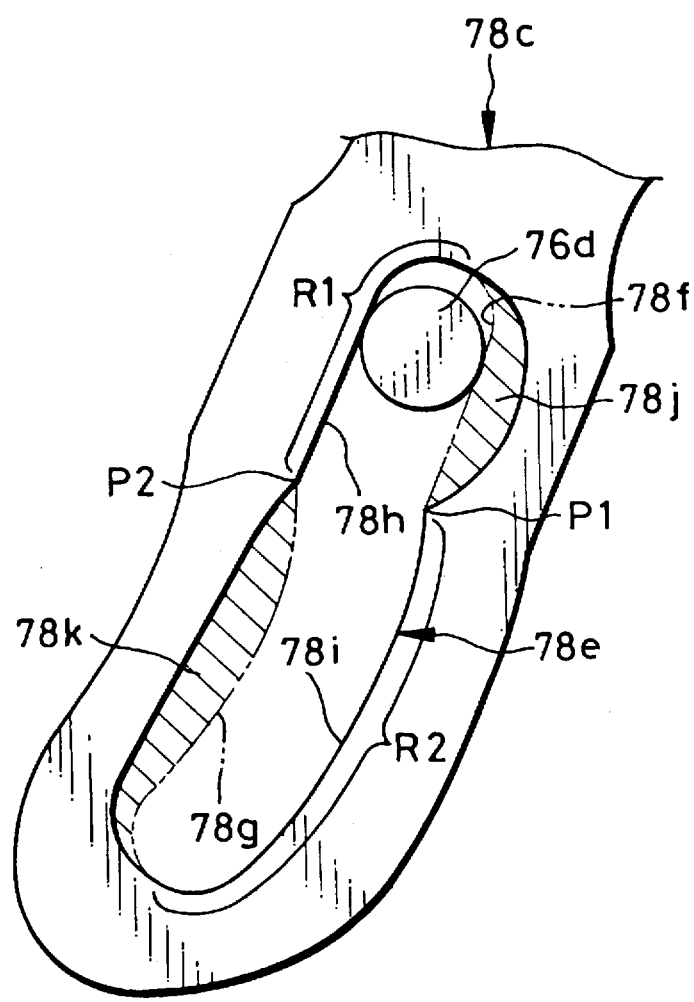
FIG. 24 is an explanatory view of a cam slot according to another embodiment of the invention.

In FIGS. 24 and 25, the uppermost position P1 of the keeping cam surface 78i determines the timing when the shutter blades 84 and 85 reach the open position, whereas the lowermost position P2 of the actuating cam surface 78h determines the timing when the shutter blades 84 and 85 begin to move to the closed position. Accordingly, the exposure time or the opening-closing time of the shutter blades 84 and 85 can be adjustable by changing the positions P1 and P2.

Figure 26:
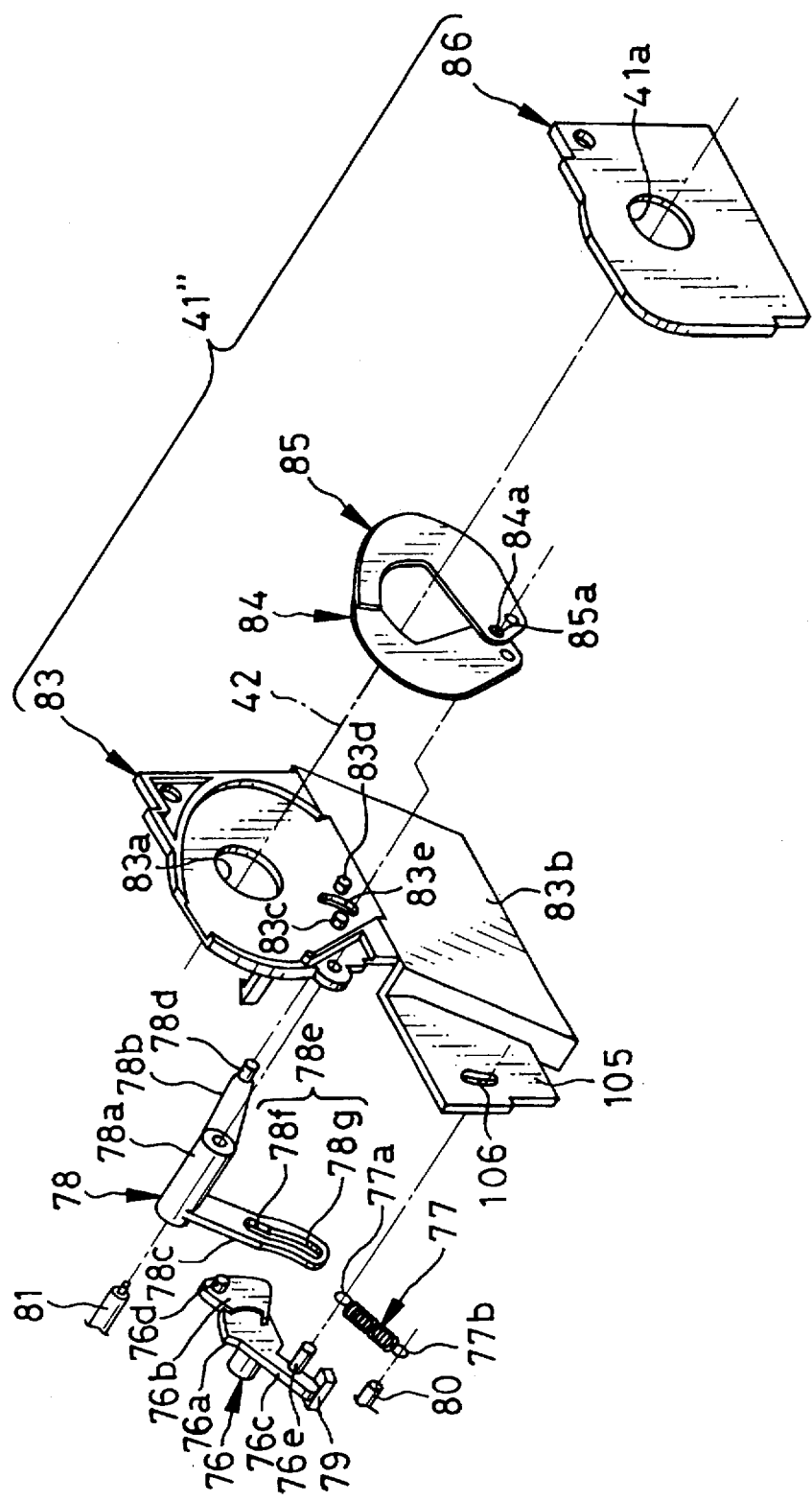
FIG. 26 is an exploded perspective view of a shutter unit according to another embodiment of the invention.
Figure 27:
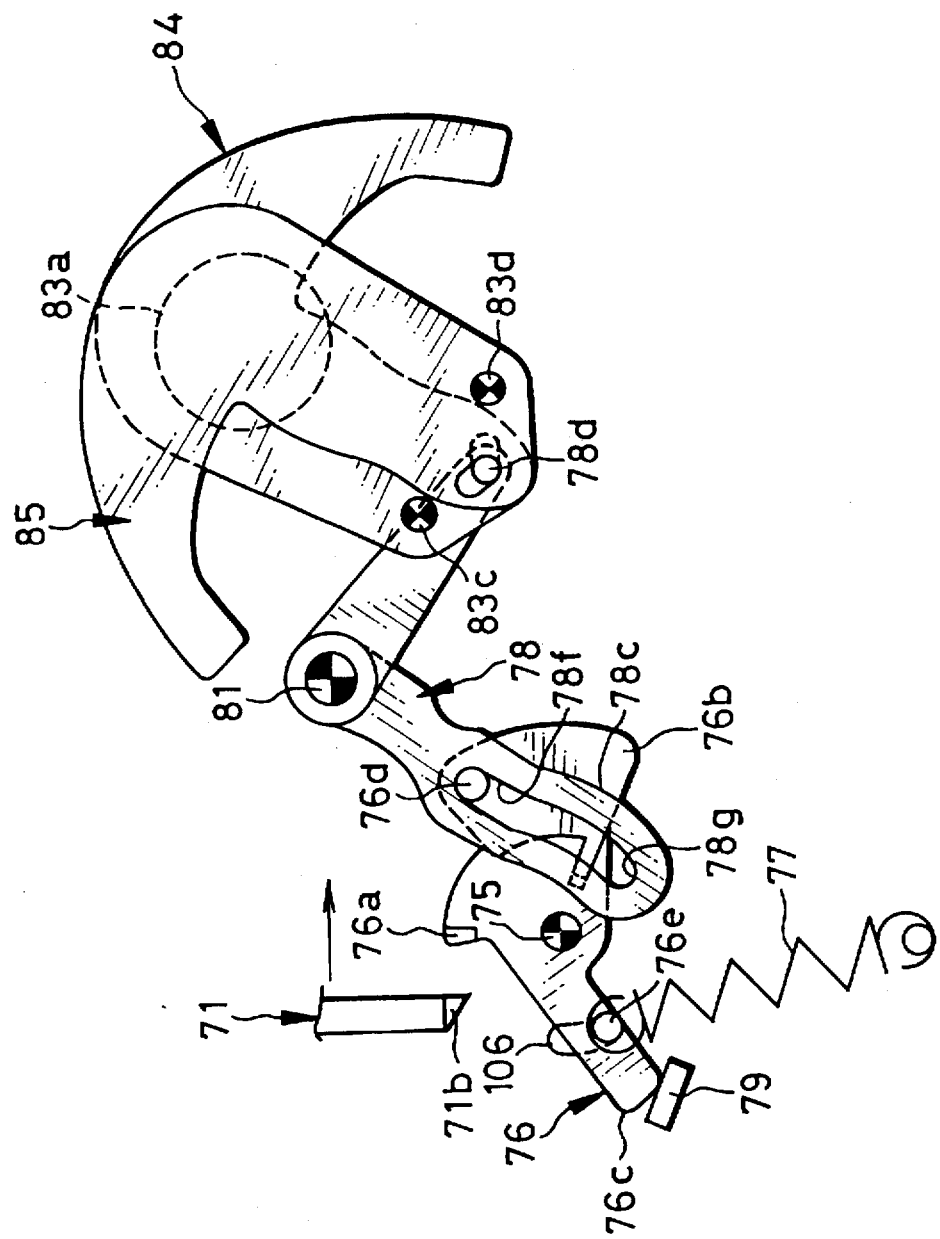
FIGS. 27 and 28 are explanatory views illustrating the operation of the shutter mechanism of the embodiment shown in FIG. 26.
Figure 28:
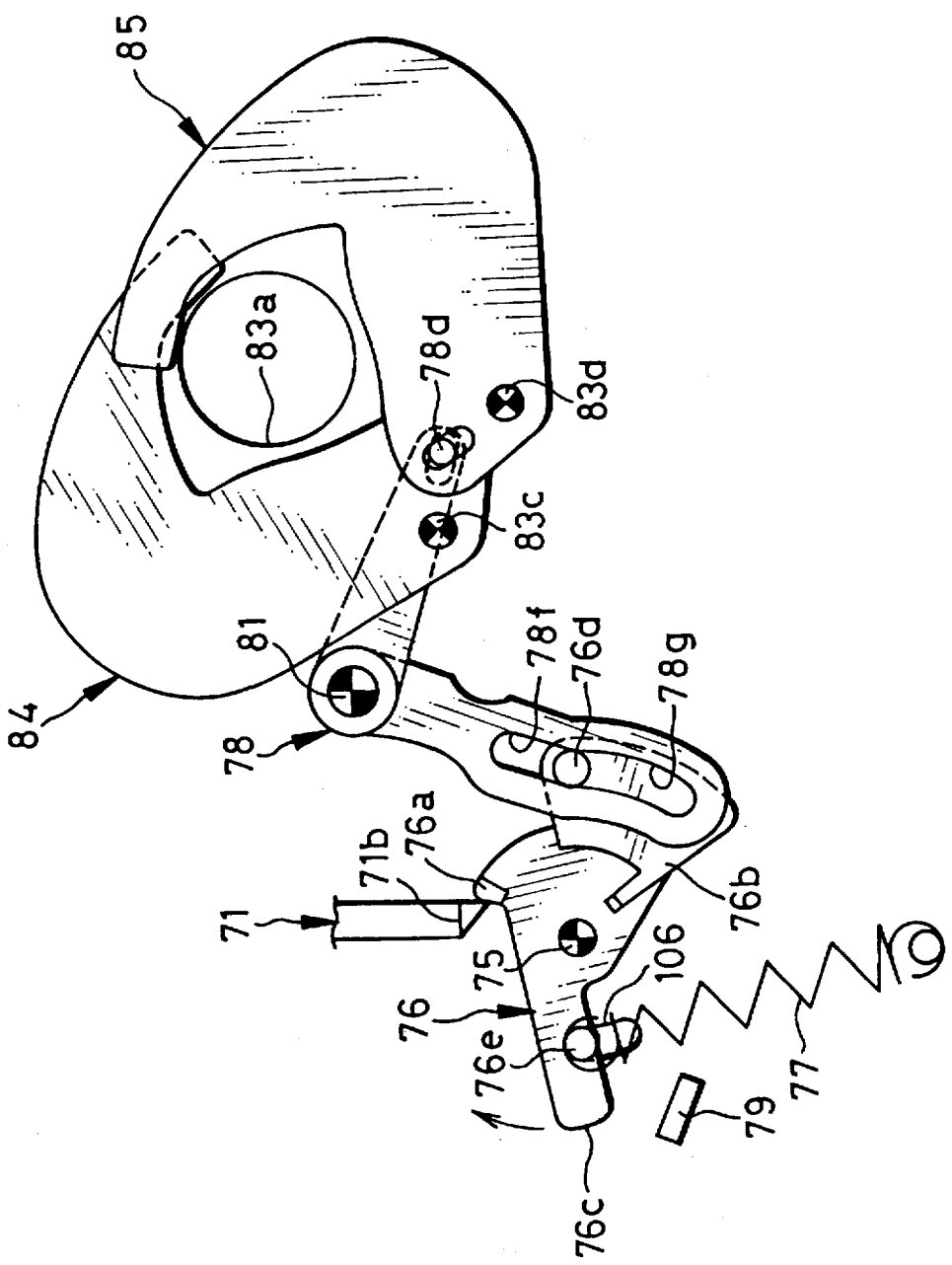

According to another embodiment shown in FIG. 26, for changing the exposure time, a cover plate 105 is formed integrally with a shutter base 83 of a shutter unit 41" on one side of a mirror cover portion 83b so as to be disposed in front of a connection lever 76, and a limiting slot 106 is formed through the cover plate 105. A pin 76e of the connection lever 76 is engaged in the limiting slot 106 so as to limit the range of movement of the connection lever 76 to limit the time of keeping shutter blades 84 and 85 in the open position. Concretely, to speed the exposure time, the pivoting amount of the connection lever 76 is limited such that the connection lever 76 is moved back as soon as the connection pin 76d comes into the keeping portion 78g of the cam slot 78e, that is, when the shutter blades 84 and 85 reach the open position, as is shown in FIG. 28. To obtain a long exposure time, the limiting slot 106 is extended in an upward direction to elongate the time duration in which the connection pin 76d moves along the keeping portion 78g and hence the shutter blades 84 and 85 is kept opened.

Figure 29:
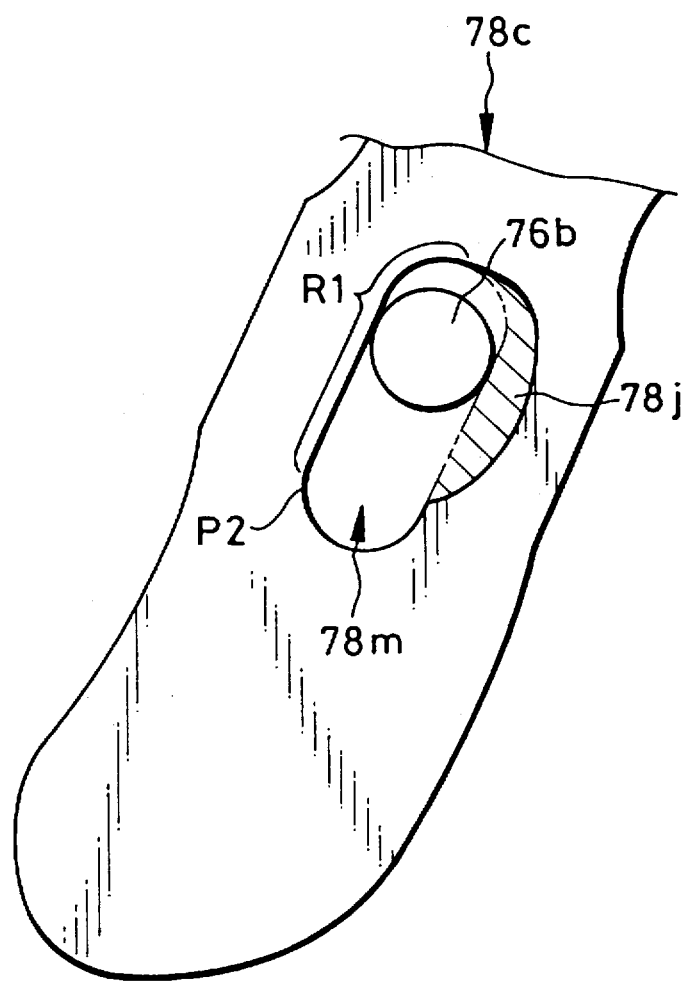
FIG. 29 is an explanatory view of a cam slot according to another embodiment of the invention.

In place of providing the limiting slot 106, it is possible to omit the keeping portion 78g and make a cam slot 78m have an actuating portion only, as shown in FIG. 29. Also in this embodiment, it is preferable to provide a relief 78j in the opposite side of the necessary or effective range R1 of the actuating portion 78m.

Figure 30:
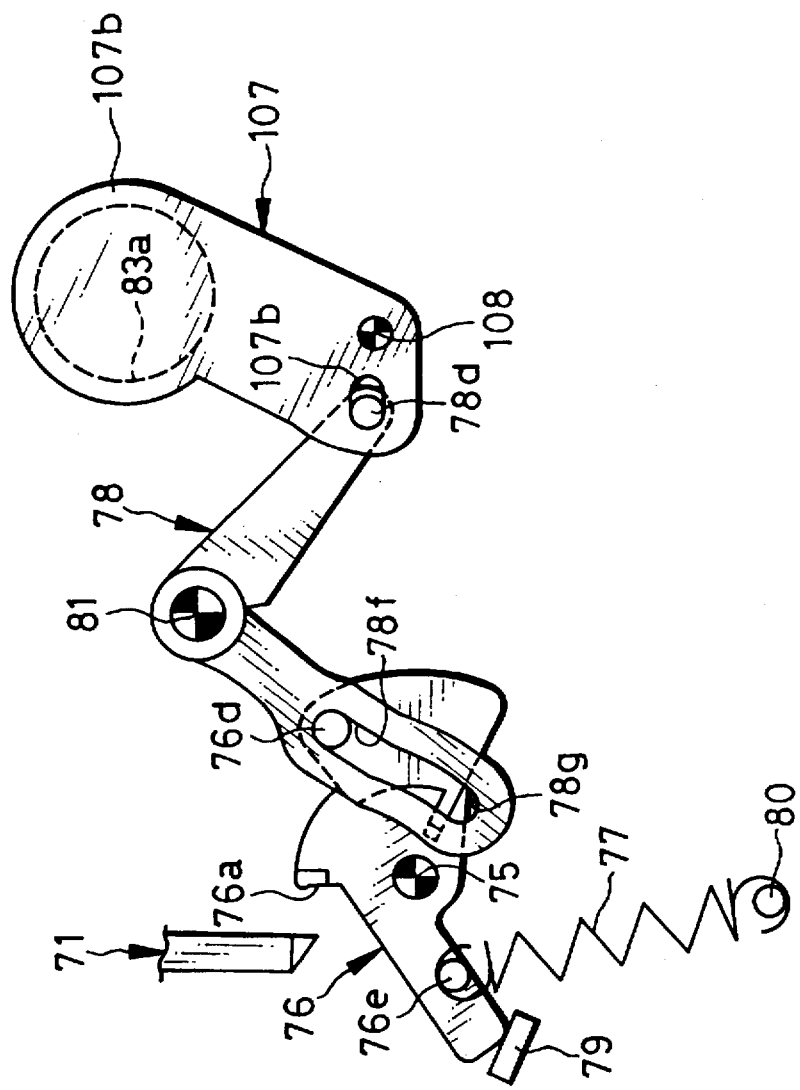
FIGS. 30 to 32 are explanatory views illustrating the operation of a shutter mechanism having a single shutter blade according another embodiment of the invention.
Figure 31:
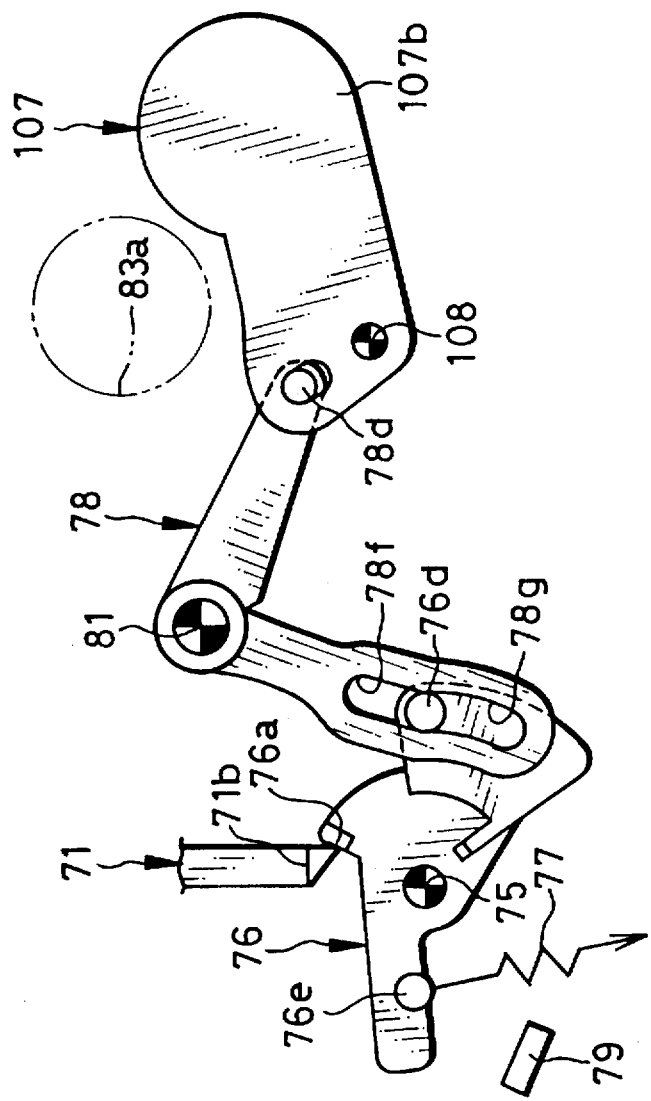
Figure 32:
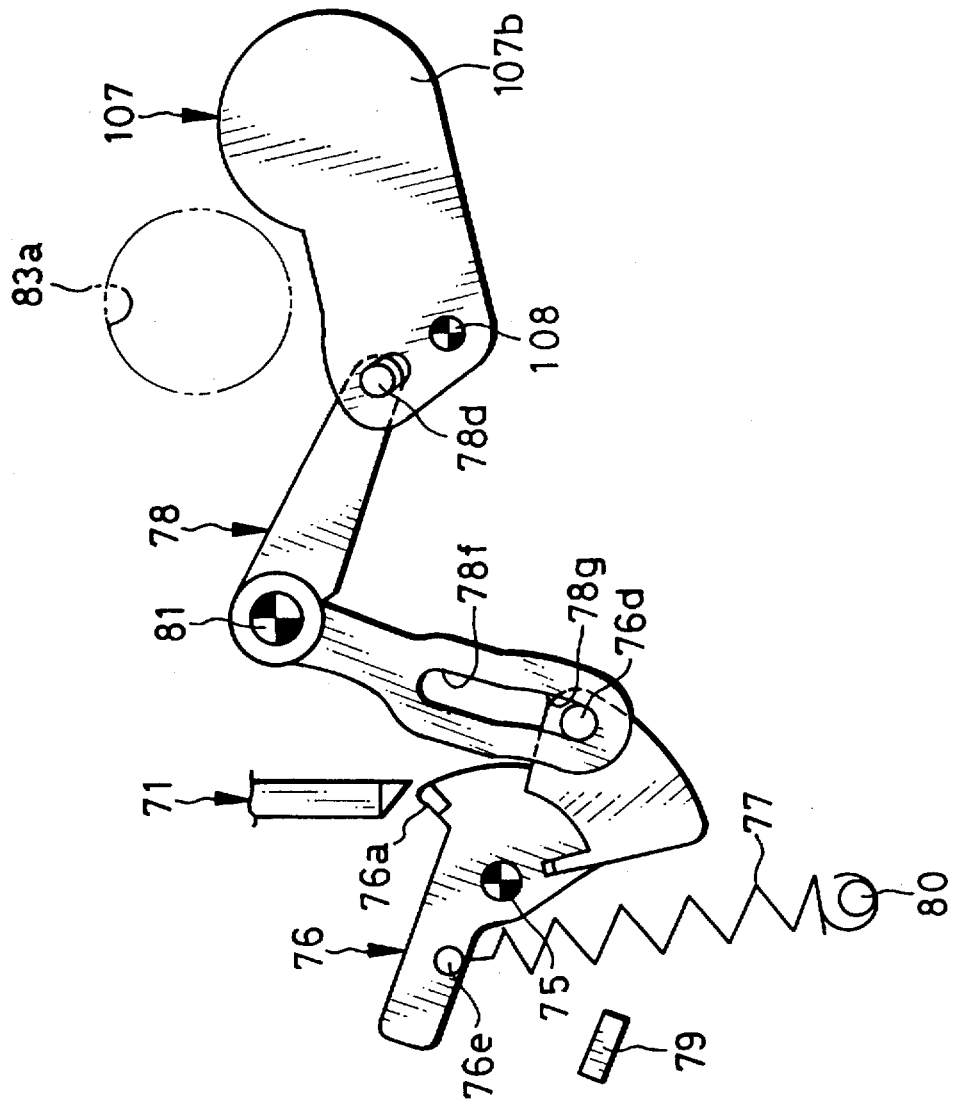

FIGS. 30 to 32 show a shutter mechanism according to another embodiment, wherein a single shutter blade 107 is used in place of the pair of shutter blades 84 and 85 so as to reduce the cost. The shutter blade 107 is pivotal about an axle 108 and has an engaging hole 107a on one side of the axle 108 to engage with a pin 78d of a crank lever 78, and a blade portion 107b for closing a shutter opening 83a is formed on an upper side of the axle 108. While a connection lever 76 is struck by a leg 71b of a shutter actuating lever 71 to rotate to move the connection pin 76d along an actuating portion 78f of a cam slot 78e, the shutter blade 107 is rotated clockwise about the axle 108 into an open position wherein the blade portion 107b opens the shutter aperture 83a to the full, as is shown in FIG. 31. Further rotation of the connection lever 76 moves the connection pin 76d into a keeping portion 78g of the cam slot 78e. So long as the connection pin 76d is in the keeping portion 78g, the crank lever 78 is not rotated so that the shutter blade 107 is kept opened, as is shown in FIG. 32. When the leg 71b of the shutter actuating lever 71 gets over an upper claw 76a, the connection lever 77 returns to the initial position under the force of a spring 77 to move the connection pin 76d back to the actuating portion 78f. Thereby, the shutter blade 107 is moved from the open position back to a close position for closing the shutter aperture 83a, as shown in FIG. 30.

Figure 33:
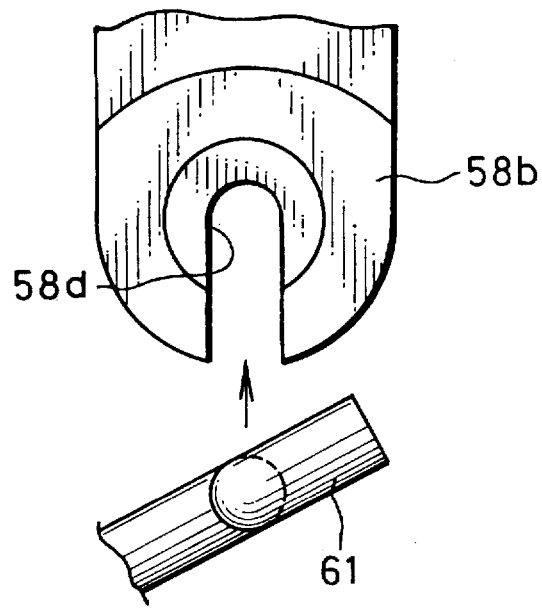
FIG. 33 is an explanatory view illustrating relationship between an engaging portion of a mode switching plate with a toggle spring in a conventional mode switching mechanism.
Figure 34:
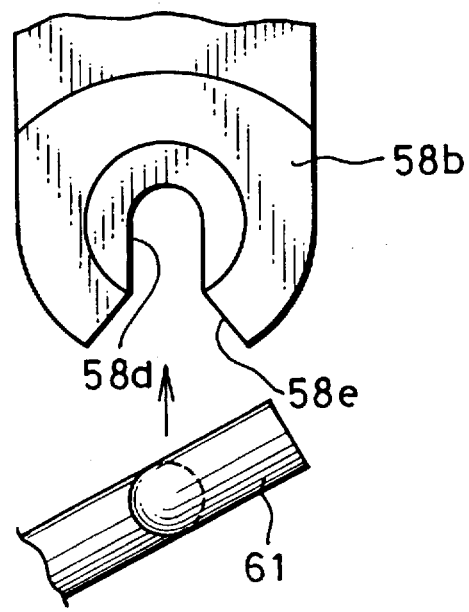
FIG. 34 is an explanatory view illustrating an engaging portion of a mode switching plate with a toggle spring in the mode switching mechanism shown in FIG. 3 or 18.

Meanwhile, it is relatively difficult to engage the toggle spring 61 with the engaging portion 58b of the mode switching plate 58. This is because a slit 58d of the engaging portion 58b has a small width which is approximately equal to the diameter of the toggle spring 61, as is shown in FIG. 33. To facilitate engagement of the toggle spring 61 into the engaging portion 58b, it is preferable to cut off both tips 58e of the engaging portion 58b so as to widen the entrance of the slit 58d to such an extent that the toggle spring 61 will not slip out the slit 58d even while the mode switching lever 58 slides, as is shown in FIG. 34.

Besides the focus of the taking lens 6 being inspected for the fine adjustment of the focus, the shutter speed and other performances of the mechanisms of the film unit 2 are inspected after the unit body 3 is completely assembled. Also the mode switching mechanism is to be inspected. At that time, it is necessary to slide the mode switching knob 11 to check if the filter 59 moves into and out of the optical path of the viewfinder 7, as well as if the lens aperture changing lever 42 moves into and out of the optical path of the taking lens 6, both in correspondence with the position of the mode switching knob 11. Therefore, it is desirable for automated inspection to make the mode switching knob easy to operate with a robot or the like.

Figure 35:
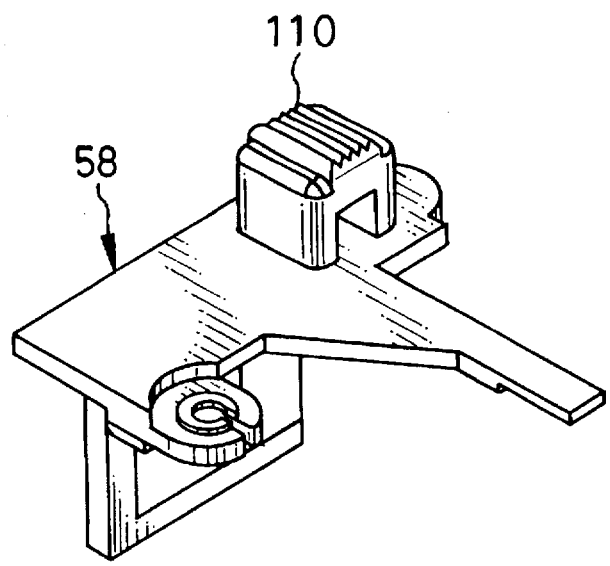
FIG. 35 is a perspective view of a mode switching plate having a mode switching knob suitable for automated inspection about mode switching function.
Figure 36:
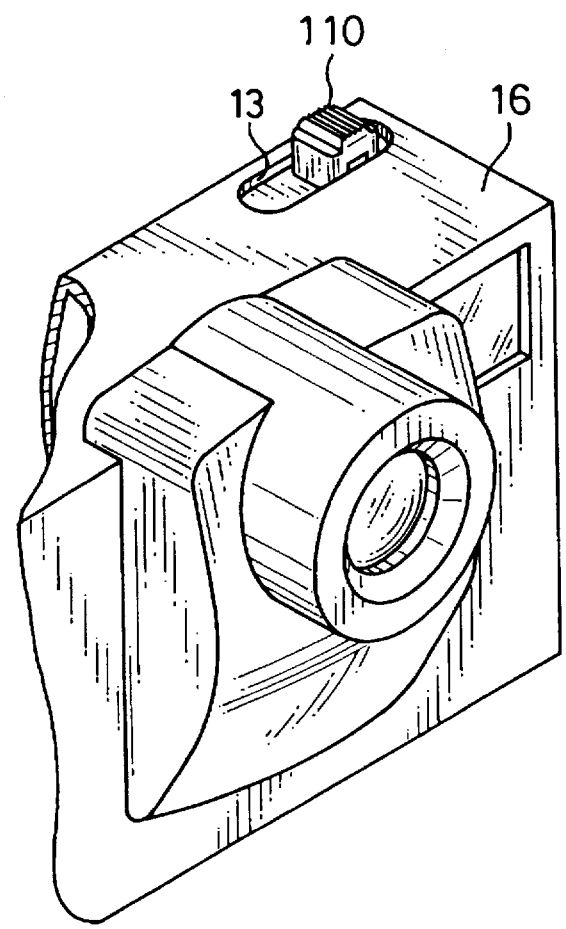
FIG. 36 is a fragmentary perspective view of a film unit mounting the mode switching plate shown in FIG. 35.

FIG. 35 shows an example of such a mode switching knob 110 which is suitable for automated inspection of the mode switching mechanism. The mode switching knob 110 has a smaller width and a larger height than the mode switching knob 11 shown in FIG. 1, such that a gap is provided between the knob 110 and either end of the slot 13, and that the knob 110 protrudes sufficiently out of the front cover 16 through the slot 13.

Figure 37A:
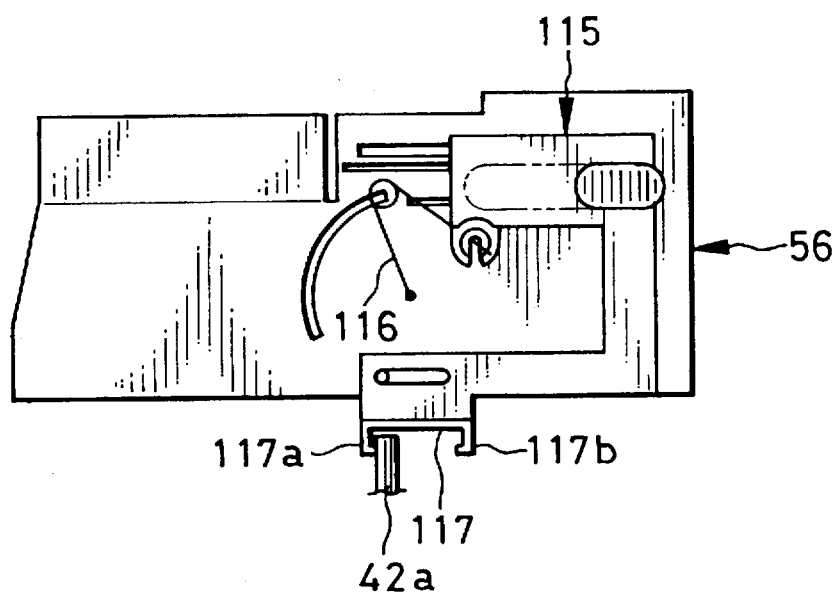
FIGS. 37A and 37B are top views of a mode switching mechanism according to another embodiment of the invention, respectively, in a daylight photography mode position and a night photography mode position.
Figure 37B:
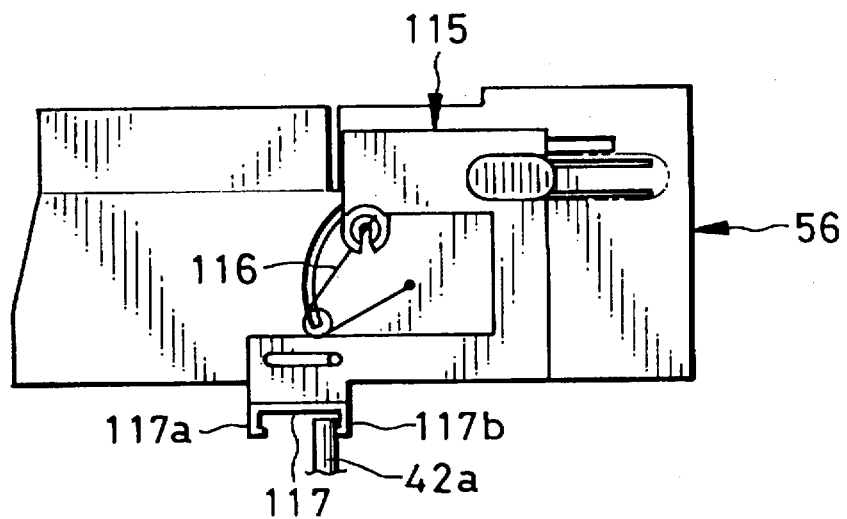

Although the mode switching mechanism of the above-described embodiment transmits the movement of the mode switching plate 58 to the lens aperture switching lever 42 through the interconnection plate 63 such that the interconnection plate 63 slides a lesser amount than the sliding amount of the mode switching plate 58 that causes it, it is possible to omit the interconnection plate 63 and form a mode switching plate 115 to have a channel-like connecting portion 117 to a lens aperture changing lever 42, as shown in FIG. 37A. According to this embodiment, the mode switching plate 115 is urged by a toggle spring 116 to the right in FIG. 37A when the mode switching plate 115 is in the right end position that corresponds to the daylight photography mode position, wherein the connecting portion 117 contacts at its left end 117a with a connection pin 42a of the lens aperture changing lever 42. When the mode switching plate 115 is in the left end position or the night photography mode position, as shown in FIG. 37B, the connecting portion 117 contacts at its right end 117b with the connection pin 42a.

Figure 38A:
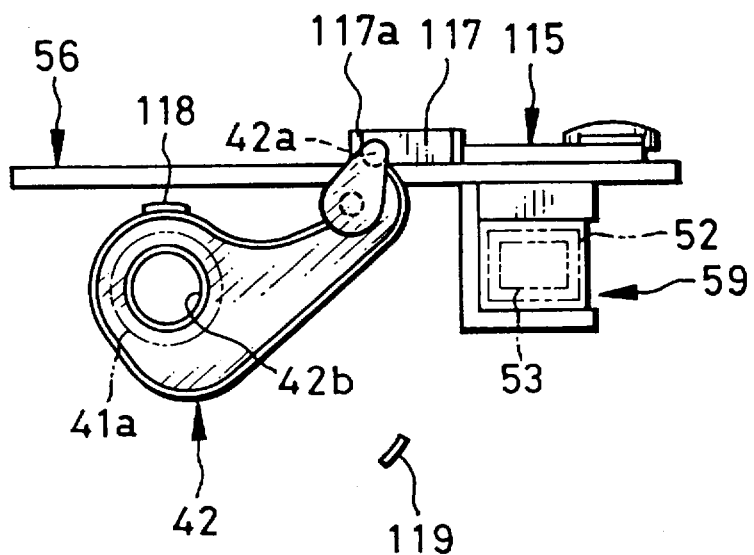
FIGS. 38A and 38B are front views of the mode switching mechanism shown in FIGS. 37A and 37B, respectively, in the daylight photography mode position and the night photography mode position.
Figure 38B:
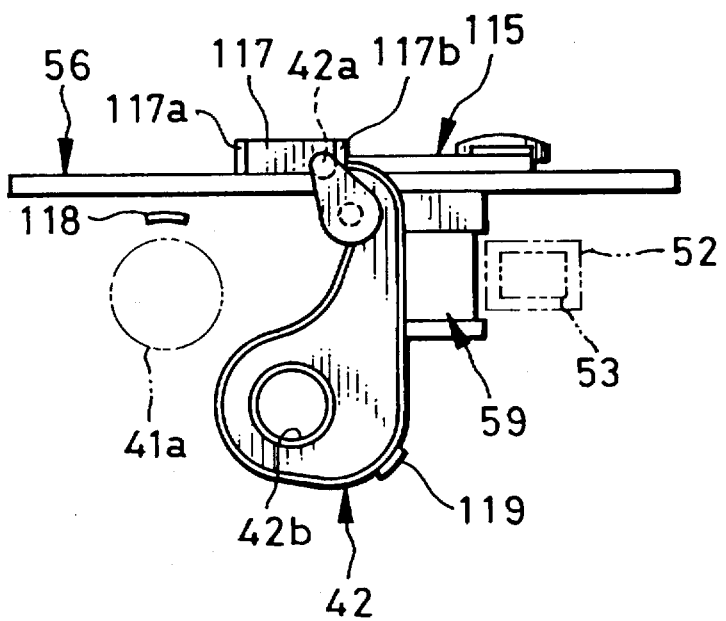

In the daylight photography mode position, as shown in FIG. 38A, a filter 59 is disposed between a finder objective lens 52 and a finder ocular 53, and a small lens aperture 42b is disposed in front of and coaxially with a large lens aperture 41a, while the lens aperture changing lever 42 is securely positioned by being contacted against a stopper 118 under the force of the toggle spring 116. In the night photography mode position, as shown in FIG. 38B, the filter 59 is retracted from the optical path of the viewfinder optical system 52 and 53, and the lens aperture changing lever 42 is retracted from the front of the large lens aperture 41a and is secured in this state, being urged by the toggle spring 116 toward a stopper 119.

As described so far, in order to alert that the film unit 2 is of lens aperture changeable type, the filter 59 is inserted between the finder lenses 52 and 53 in the daylight photography mode to make the subject shown with reduced brightness through the viewfinder 7. However, some user might feel obscure viewing through the filter 59 even in the daylight photography and retract the filter 59 without reading the information, or some user might forget to switch the film unit 2 back to the daylight photography mode and take the following pictures with the large lens aperture 41a. In those case, many number of over-exposed photographs could be made.

Figure 39A:
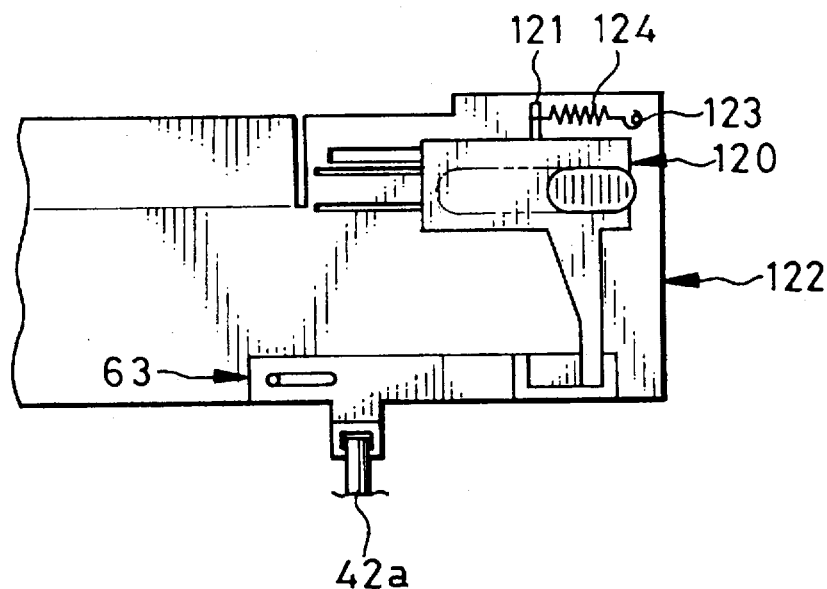
FIGS. 39A and 39B are top views of a mode switching mechanism according to a further embodiment of the invention.
Figure 39B:
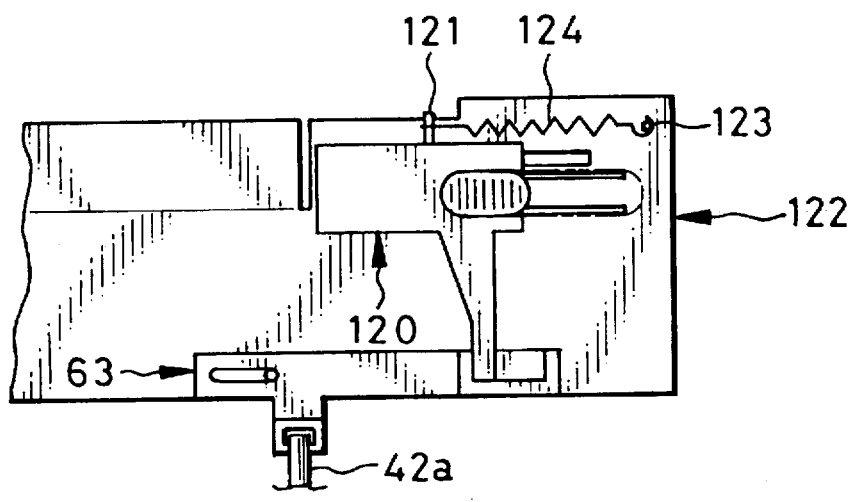

An embodiment shown in FIGS. 39A and 39B is intended to prevent such trouble. In this embodiment, a mode switching plate 120 has a pin 121, and a top plate 122, on which the mode switching plate 120 is slidably mounted, has a pin 123, and a coiled spring 123 is suspended between the pins 121 and 123 to urge the mode switching plate 120 toward the daylight photography mode position as shown in FIG. 39A, wherein a not-shown filter is inserted in the optical path of the viewfinder. According to this embodiment, if the photographer slides the mode switching plate 120 to the left to retract the filter from the viewfinder, as is shown in FIG. 39B, the mode switching plate 120 returns to the initial position shown in FIG. 39A under the force of the coiled spring 124 when the photographer terminates pushing the mode switching plate 120 to the left. As a result, the filter is automatically set in the viewfinder. Thus alerted, even a beginning user would recognize the difference of the film unit 2 from conventional standard ones, and could take photographs while appropriately changing the lens aperture size if read the information on the outer case 4.

It is to be noted that, in the above-described embodiments, like or equivalent elements are designated by the same reference numerals as the first described embodiment so that the detailed description thereof will be omitted for brevity.

Although the lens aperture changing lever 42 is swinging into and out of the optical path of the taking lens 6, it is possible to slide a plate having a small lens aperture into and out of the optical path of the taking lens 6. It may be possible to provide a cam slot in the engaging portion between the crank lever and the shutter blades, instead of the cam slot 78e.

The lens aperture changing mechanism of the present invention is applicable not only to telephoto-type film unit, but also to a film unit changeable between standard and panoramic photography modes or between close-up and standard photography modes or the like, as well as to a compact camera.

Although the present invention has been described with respect to the preferred embodiments shown in the drawings, the present invention is not to be limited to these embodiments, but on the contrary, various modification may be possible without departing from the scope of the appended claims.

What is claimed is:

1. In a lens-fitted photographic film unit previously loaded with unexposed photographic film and having a taking lens, and an exposure mechanism for exposing said photographic film, said exposure mechanism comprising a shutter actuating member which is moved from a released position to a cocked position upon one frame advance of said photographic film, and returns to the released position under a biasing force upon a shutter release operation, and a shutter blade member which is biased toward a closed position for closing an aperture disposed on an optical axis of said taking lens and makes one reciprocating movement between said closed position and an open position for opening said aperture while said shutter actuating member returns to the released position, the improvement comprising:

a connection lever which is caused by said shutter actuating member to swing from an initial position to a turning position against a biasing force and swing back to said initial position under the biasing force while said shutter actuating member returns to the released position; and a crank lever having an axial portion extending parallel to said optical axis and first and second radial arms on opposite ends of said axial portion, wherein said connection lever is coupled to said first arm of said crank lever, whereas said shutter blade member is coupled to said second arm so as to permit said shutter blade member to swing in a different plane from said connection lever with respect to said optical axis.

2. A lens-fitted photographic film unit as recited in claim 1, wherein said axial portion of said crank lever has a length determined depending upon a focal length of said taking lens.

3. A lens-fitted photographic film unit as recited in claim 1, wherein said shutter blade member comprises a pair of shutter blades mounted to be movable concurrently in opposite directions.

4. A lens-fitted photographic film unit as recited in claim 1, further comprising a cam portion formed in said crank lever, said cam portion including an actuating portion for transmitting rotational movement of said connection lever to said shutter blade member while said connection lever moves between the initial position and a first position which is located before said turning position and corresponds to said open position of said shutter blade member, and a keeping portion for not transmitting rotational movement of said connection lever while said connection lever moves between said first position and said turning position so as to keep said shutter blade member in said open position for a predetermined time.

5. A lens-fitted photographic film unit as recited in claim 4, wherein said keeping portion has a cam surface which extends along a path of said connection lever while said connection lever moves between said first and turning positions.

6. A lens-fitted photographic film unit as recited in claim 4, wherein said shutter blade member comprises a pair of shutter blades mounted to be movable concurrently in opposite directions.

7. A lens-fitted photographic film unit as recited in claim 4, wherein said cam portion is a cam slot in which a pin formed on said connection lever is slidably engaged, said cam slot having reliefs for providing slacks for said pin of said connection lever.

8. A lens-fitted photographic film unit as recited in claim 4, further comprising a stopper member for stopping said crank lever or said connection lever from rotating when said shutter blade member reaches in said closed position, a surface of said stopper member which comes into contact with said lever extending diagonally to a path of said crank lever or the path of said connection lever.

9. A lens-fitted photographic film unit as recited in claim 4, further comprising a limiting member for limiting rotational movement of said connection lever or said crank lever so as to adjust time of keeping said shutter blade member in said open position.

10. A lens-fitted photographic film unit as recited in claim 9, wherein said limiting member is a slot through which a portion of said connection lever or said crank lever is guided.

11. A lens-fitted photographic film unit as recited in claim 1, wherein said lens-fitted photographic film unit is of a telephoto-type and further comprises a pair of mirrors disposed behind and below said taking lens so as to provide a Z-shaped light path from said taking lens toward said photographic film.

12. A lens-fitted photographic film unit as recited in claim 11, wherein said taking lens has a focal length of about 100 mm, and said aperture has a diameter of 5 to 6 mm.

13. A lens-fitted photographic film unit as recited in claim 11, wherein said shutter blade member comprises a pair of shutter blades mounted to be movable concurrently in opposite directions.

14. A lens-fitted photographic film unit as recited in claim 11, further comprising:

an optical viewfinder having an objective lens and an ocular;

a lens aperture changing member having a lens aperture smaller than said aperture and movable behind said taking lens in a plane perpendicular to the optical axis of said taking lens;

a switching member horizontally slidable above said viewfinder and having a switching knob operable from the outside of said film unit;

an interconnection member interconnecting said lens aperture changing member to said switching member to transmit the sliding movement of said switching member to said lens aperture changing member while reducing the amount of said sliding movement, so as to place or displace said lens aperture into or out of said optical path of said taking lens in correspondence with said switching knob; and a semi-transparent filter provided on a bottom side of said switching member so as to be inserted between said objective lens and said ocular nearer to said ocular when said lens aperture is inserted in said optical path of said taking lens.

15. A lens-fitted photographic film unit as recited in claim 14, wherein said lens aperture changing member is a lever mounted pivotal about an axis and having said lens aperture on one end portion thereof relative to said axis, and coupled to said switching member at the opposite end thereof relative to said axis, and wherein said one end portion having said lens aperture is inserted in said optical path behind said taking lens through a slit formed through a lens barrel portion which holds said taking lens.

16. A lens-fitted photographic film unit as recited in claim 15, wherein said lens barrel portion is formed integrally with a shutter cover plate mounted in front of said shutter blade member, and said lens aperture changing lever is pivotally mounted to a front portion of said shutter cover plate.

17. A lens-fitted photographic film unit as recited in claim 14, wherein said switching member is biased toward a position wherein said lens aperture of said lens aperture changing member is inserted in said optical path of said taking lens.

18. A lens-fitted photographic film unit as recited in claim 14, wherein said semi-transparent filter reduces light traveling through said viewfinder to such an extent that a subject being less illuminated than a predetermined level cannot be sufficiently viewed through said viewfinder.

19. In a lens-fitted photographic film unit previously loaded with unexposed photographic film and having a taking lens, an exposure mechanism for exposing a portion of said photographic film defined by an exposure frame, an exposure chamber disposed between said taking lens and said exposure frame, a pair of mirrors attached to windows formed through said exposure chamber in a direction diagonal to an optical axis of said taking lens so as to provide a Z-shaped light path in said exposure chamber, the improvement wherein:

at least one of said windows is trapezoid-shaped, said trapezoid shape corresponding to a size and shape of said exposure frame as reflected in a corresponding one of said pair of mirrors; and wherein at least a pair of opposing sides of said at least one said trapezoid-shaped window is curved inwardly convex.

* * * * *